US012571558B2

(12) United States Patent
Sinha et al.

(10) Patent No.: US 12,571,558 B2
(45) Date of Patent: Mar. 10, 2026

(54) SMART VENT SYSTEM FOR LOCALIZED AIR QUALITY CONTROL

(71) Applicant: Johnson Controls Tyco IP Holdings LLP, Milwaukee, WI (US)

(72) Inventors: Vineet Binodshanker Sinha, Brookfield, WI (US); Karl F. Reichenberger, Mequon, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 18/073,359

(22) Filed: Dec. 1, 2022

(65) Prior Publication Data

US 2023/0094692 A1     Mar. 30, 2023

Related U.S. Application Data

(63) Continuation of application No. 16/676,155, filed on Nov. 6, 2019, now abandoned.

(Continued)

(51) Int. Cl.
*F24F 11/74*          (2018.01)
*B01D 46/00*          (2022.01)
(Continued)

(52) U.S. Cl.
CPC .......... *F24F 11/74* (2018.01); *B01D 46/0086* (2013.01); *B01D 46/0093* (2013.01);
(Continued)

(58) Field of Classification Search
CPC .. F24F 11/74; F24F 11/58; F24F 11/65; F24F 2110/20; F24F 2110/64; B01D 46/0086;
(Continued)

(56) References Cited

U.S. PATENT DOCUMENTS 5,810,662 A     9/1998   Van Becelaere
6,814,660 B1    11/2004  Cavett
(Continued)

FOREIGN PATENT DOCUMENTS

CA     2957726 A1     3/2016
CA     3043996 A1     2/2018
(Continued)

OTHER PUBLICATIONS

Coolinglogic, "CoolingLogic: Up early, saving billions." URL: http://coolinglogic.com/documents/MarketingFlyer_FINAL_HiRes8. 5x11.pdf, retrieved from internet Oct. 27, 2022 (1 page).
(Continued)

*Primary Examiner* — Robert Clemente
(74) *Attorney, Agent, or Firm* — Foley & Lardner LLP

(57)          ABSTRACT
An environmental control system for a building, the system including a vent. The vent includes one or more louvers configured to change position between an open position and a closed position to permit air from the air duct to enter a zone of the building or stop the air from entering the zone and a vent circuit configured to operate the one or more louvers based on one or more control commands. The system includes a controller device including a processing circuit configured to receive a selection of an operating profile from a plurality of predefined operating profiles for the vent, each of the plurality of predefined operating profiles indicating an intended use of the zone, determine, based on the operating profile, the one or more control commands, and cause the vent circuit to operate the one or more louvers based on the one or more control commands.

20 Claims, 19 Drawing Sheets

Related U.S. Application Data

(60) Provisional application No. 62/756,905, filed on Nov. 7, 2018.

(51) Int. Cl.

| | |
|---|---|
| *B01D 46/42* | (2006.01) |
| *B01D 46/44* | (2006.01) |
| *B01D 46/46* | (2006.01) |
| *F24F 11/35* | (2018.01) |
| *F24F 11/52* | (2018.01) |
| *F24F 11/58* | (2018.01) |
| *F24F 11/65* | (2018.01) |
| *F24F 13/15* | (2006.01) |
| *F24F 13/28* | (2006.01) |
| *F24F 110/20* | (2018.01) |
| *F24F 110/64* | (2018.01) |

(52) U.S. Cl.

CPC ....... *B01D 46/4263* (2013.01); *B01D 46/442* (2013.01); *B01D 46/46* (2013.01); *F24F 11/35* (2018.01); *F24F 11/52* (2018.01); *F24F 11/58* (2018.01); *F24F 11/65* (2018.01); *F24F 13/15* (2013.01); *F24F 13/28* (2013.01); *B01D 2279/50* (2013.01); *F24F 2110/20* (2018.01); *F24F 2110/64* (2018.01); *F24F 2221/34* (2013.01)

(58) Field of Classification Search

CPC ........... B01D 46/0096; B01D 46/4263; B01D 46/442; B01D 46/46; B01D 2279/50

USPC .................... 55/385.1, DIG. 34; 96/416–422

See application file for complete search history.

(56) References Cited

U.S. PATENT DOCUMENTS

| | | | |
|---|---|---|---|
| 7,168,627 B2 | 1/2007 | Kates | |
| 8,249,731 B2 | 8/2012 | Tran et al. | |
| 8,521,332 B2 | 8/2013 | Tiemann et al. | |
| 9,208,676 B2 | 12/2015 | Fadell et al. | |
| 9,447,985 B2 | 9/2016 | Johnson | |
| 9,964,328 B2 | 5/2018 | Ribbich et al. | |
| 10,371,399 B1 | 8/2019 | Rodriguez | |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2004/0217072 A1* | 11/2004 | Bash ................. | H05K 7/20718 361/692 |
| 2004/0224627 A1 | 11/2004 | Becelaere et al. | |
| 2005/0082053 A1 | 4/2005 | Halabi | |
| 2010/0012737 A1 | 1/2010 | Kates | |
| 2011/0077758 A1 | 3/2011 | Tran et al. | |
| 2011/0172828 A1 | 7/2011 | Schmidt et al. | |
| 2011/0253796 A1 | 10/2011 | Posa et al. | |
| 2014/0312126 A1 | 10/2014 | Ramini | |
| 2015/0133043 A1 | 5/2015 | Patel et al. | |
| 2016/0001212 A1* | 1/2016 | Miller ................... | B01D 46/46 55/418 |
| 2016/0146489 A1 | 5/2016 | Najafi | |
| 2016/0178228 A1 | 6/2016 | Shahabdeen | |
| 2016/0243486 A1* | 8/2016 | Galsim .............. | B01D 46/0086 |
| 2017/0176034 A1 | 6/2017 | Hussain et al. | |
| 2017/0189844 A1* | 7/2017 | McLeod ............... | B01D 46/46 |
| 2017/0322534 A1 | 11/2017 | Sinha et al. | |
| 2018/0202674 A1 | 7/2018 | Lin et al. | |
| 2018/0299150 A1 | 10/2018 | Ajax et al. | |
| 2018/0299158 A1 | 10/2018 | Ajax et al. | |
| 2018/0314219 A1 | 11/2018 | Gamroth et al. | |
| 2018/0356114 A1 | 12/2018 | O'Hora | |
| 2019/0234632 A1* | 8/2019 | Reeder ................. | F24F 11/0001 |
| 2019/0257545 A1* | 8/2019 | Ko ........................... | F24F 11/56 |
| 2019/0277530 A1 | 9/2019 | Schwegler et al. | |
| 2019/0285305 A1 | 9/2019 | Kunnathully Jayakumar | |
| 2020/0049358 A1 | 2/2020 | Suciu et al. | |
| 2020/0049365 A1 | 2/2020 | Thoni et al. | |
| 2021/0156582 A1 | 5/2021 | Stevenson et al. | |
| 2021/0222903 A1 | 7/2021 | Bykowski et al. | |
| 2022/0026101 A1 | 1/2022 | Ko | |
| 2023/0375207 A1 | 11/2023 | Klein et al. | |

FOREIGN PATENT DOCUMENTS

| | | |
|---|---|---|
| CN | 104033944 B | 8/2016 |
| EP | 3 186 687 A4 | 7/2017 |
| EP | 3 497 377 A1 | 6/2019 |
| WO | WO-2006/058631 A1 | 6/2006 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "Jla Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-

(56) References Cited

OTHER PUBLICATIONS

Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

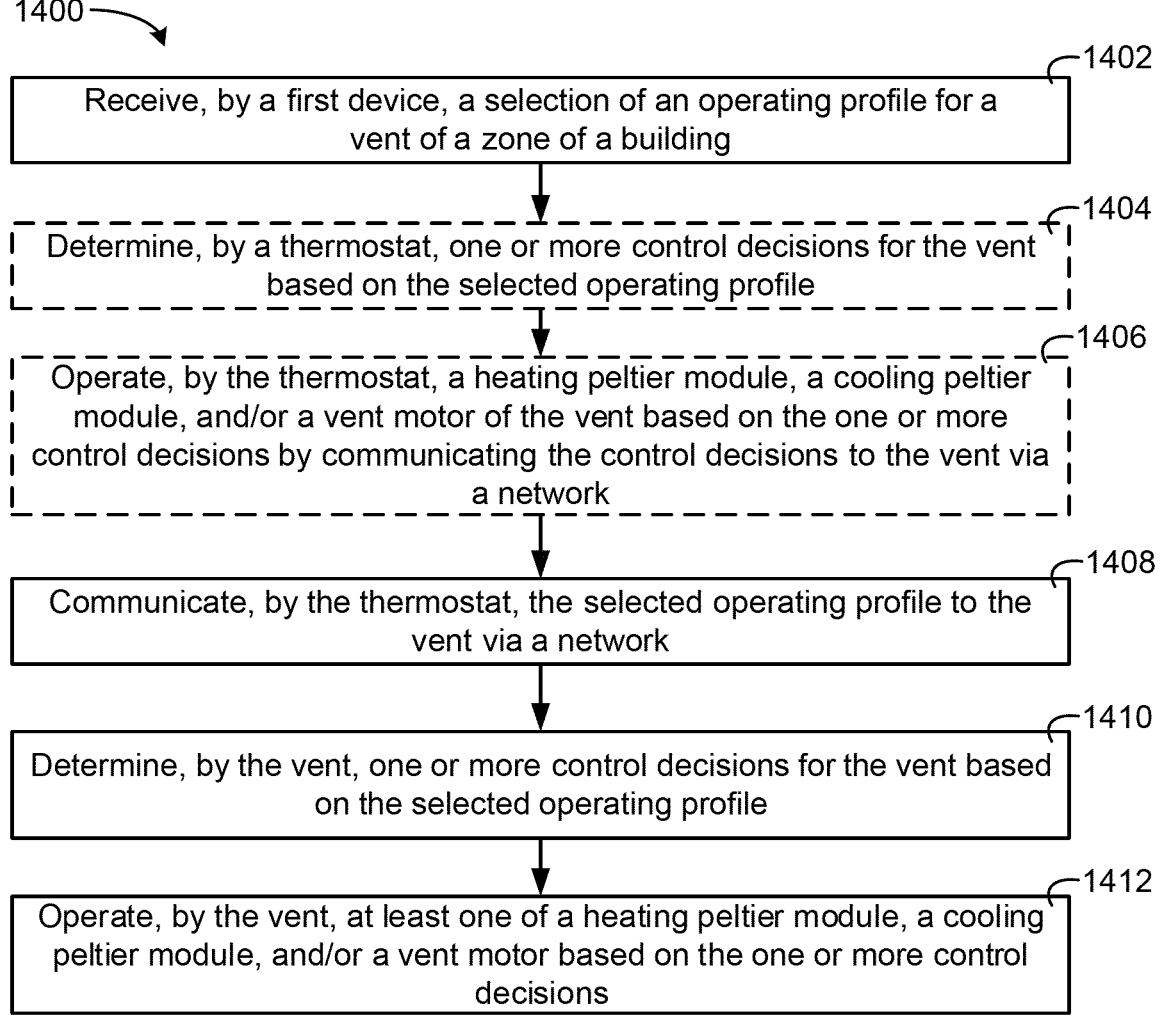

1400

1402
Receive, by a first device, a selection of an operating profile for a vent of a zone of a building 1404
Determine, by a thermostat, one or more control decisions for the vent based on the selected operating profile 1406
Operate, by the thermostat, a heating peltier module, a cooling peltier module, and/or a vent motor of the vent based on the one or more control decisions by communicating the control decisions to the vent via a network 1408
Communicate, by the thermostat, the selected operating profile to the vent via a network 1410
Determine, by the vent, one or more control decisions for the vent based on the selected operating profile 1412
Operate, by the vent, at least one of a heating peltier module, a cooling peltier module, and/or a vent motor based on the one or more control decisions

FIG. 14

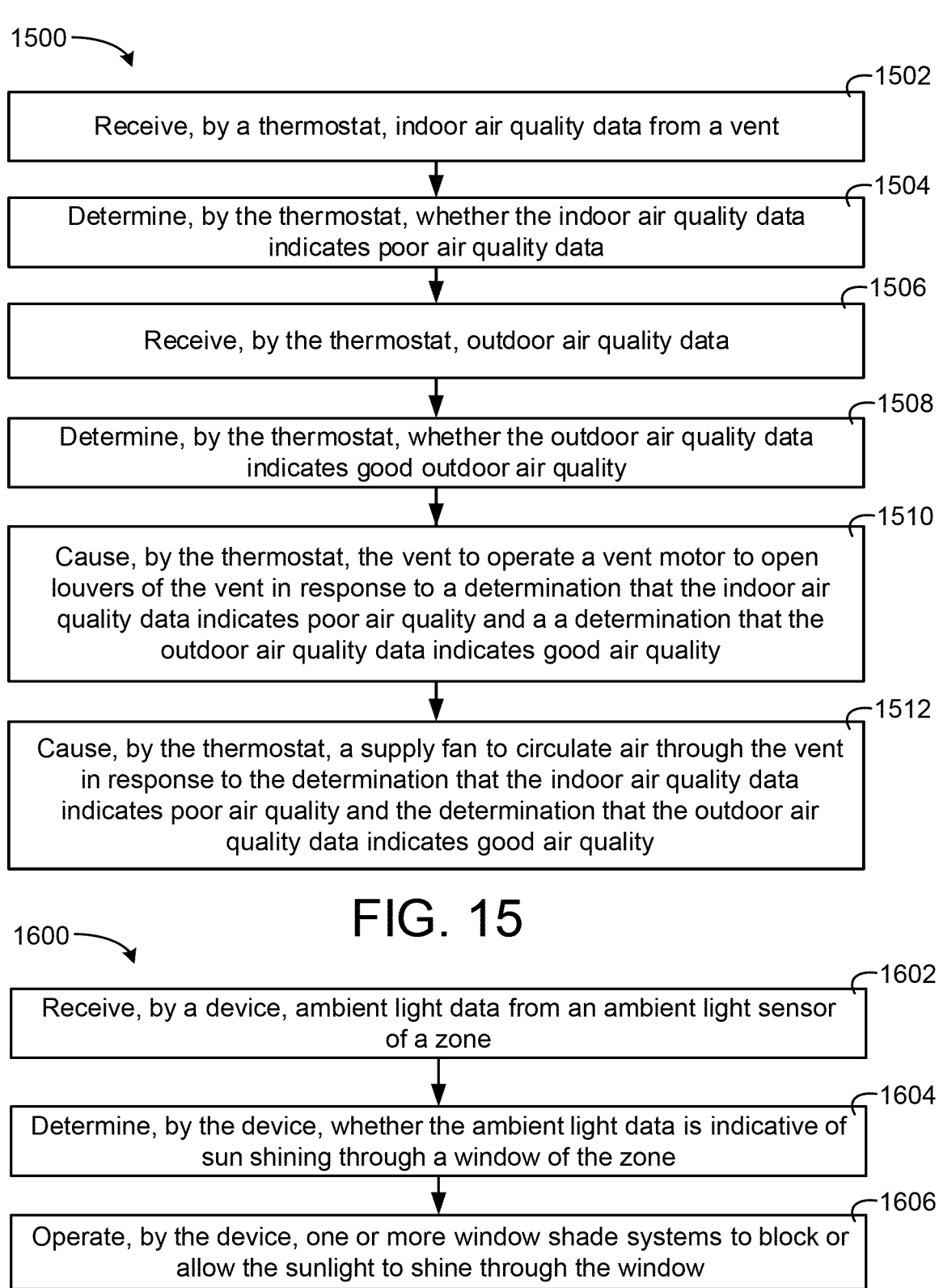

1500

1502
Receive, by a thermostat, indoor air quality data from a vent

1504
Determine, by the thermostat, whether the indoor air quality data indicates poor air quality data 1506
Receive, by the thermostat, outdoor air quality data 1508
Determine, by the thermostat, whether the outdoor air quality data indicates good outdoor air quality 1510
Cause, by the thermostat, the vent to operate a vent motor to open louvers of the vent in response to a determination that the indoor air quality data indicates poor air quality and a a determination that the outdoor air quality data indicates good air quality 1512
Cause, by the thermostat, a supply fan to circulate air through the vent in response to the determination that the indoor air quality data indicates poor air quality and the determination that the outdoor air quality data indicates good air quality

1602
Receive, by a device, ambient light data from an ambient light sensor of a zone 1604
Determine, by the device, whether the ambient light data is indicative of sun shining through a window of the zone 1606
Operate, by the device, one or more window shade systems to block or allow the sunlight to shine through the window

Figures 19, 20:
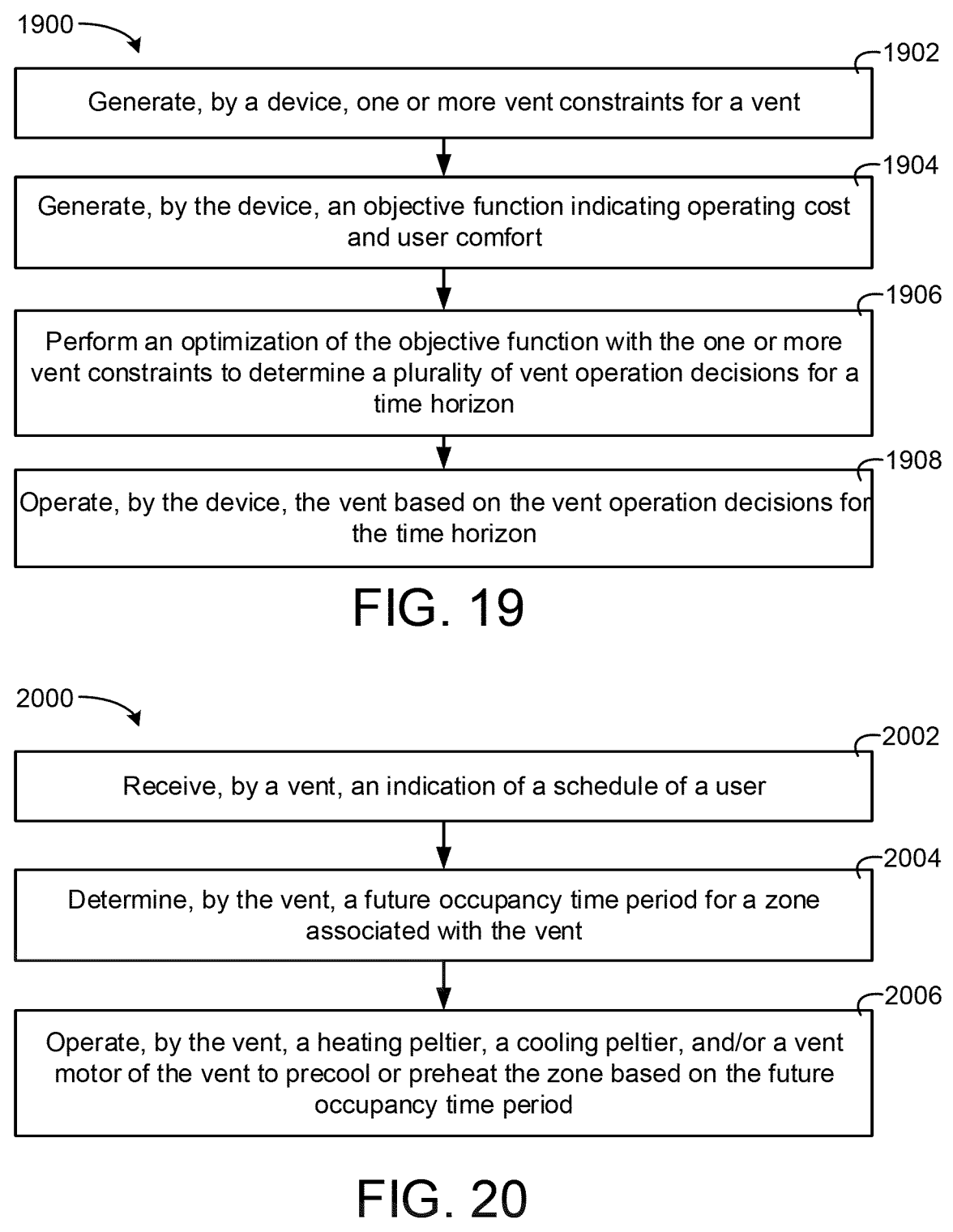

Generate, by a device, one or more vent constraints for a vent

1904

Generate, by the device, an objective function indicating operating cost and user comfort

1906

Perform an optimization of the objective function with the one or more vent constraints to determine a plurality of vent operation decisions for a time horizon

1908

Operate, by the device, the vent based on the vent operation decisions for the time horizon

Receive, by a vent, an indication of a schedule of a user

2004

Determine, by the vent, a future occupancy time period for a zone associated with the vent

2006

Operate, by the vent, a heating peltier, a cooling peltier, and/or a vent motor of the vent to precool or preheat the zone based on the future occupancy time period

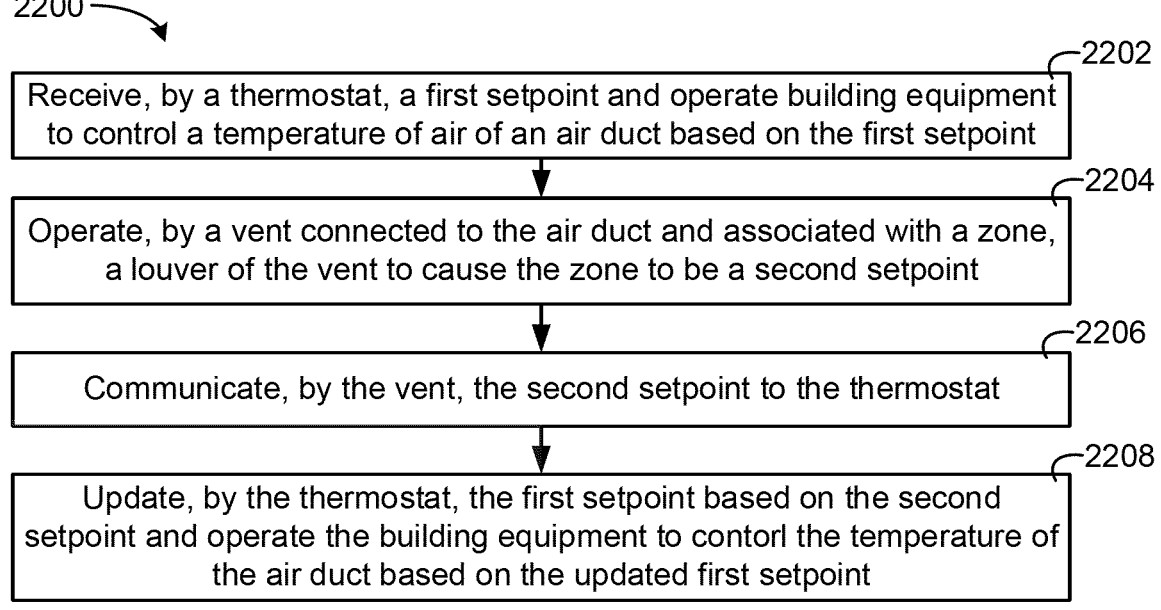

2202

Receive, by a thermostat, a first setpoint and operate building equipment to control a temperature of air of an air duct based on the first setpoint

2204

Operate, by a vent connected to the air duct and associated with a zone, a louver of the vent to cause the zone to be a second setpoint

2206

Communicate, by the vent, the second setpoint to the thermostat

2208

Update, by the thermostat, the first setpoint based on the second setpoint and operate the building equipment to contorl the temperature of the air duct based on the updated first setpoint

FIG. 22

SMART VENT SYSTEM FOR LOCALIZED AIR QUALITY CONTROL

CROSS-REFERENCE TO RELATED PATENT APPLICATION

This application is a continuation of U.S. patent application Ser. No. 16/676,155 filed Nov. 6, 2019, which claims the benefit of and priority to U.S. Provisional Patent Application No. 62/756,905 filed Nov. 7, 2018, the entirety of which is incorporated by reference herein.

BACKGROUND

The present disclosure relates generally to building systems that control environmental conditions for a building. The present disclosure relations more particularly to vents of a building system.

Systems of a building may include various components configured to heat and/or cool the building. Heating and/or cooling units, configured to heat and/or cool air supplied to the building, can include residential furnaces, air conditioners, and/or heat pumps and furthermore various industrial based heating or cooling units. In many cases, a user provides desired environmental settings, e.g., a temperature setpoint, to a thermostat which in turn operates the heating and/or cooling units. In some systems, a heating or cooling unit heats and/or cools the entire building according to a single setpoint. In these systems, there is no local control within various rooms of the building, i.e., the systems lack local control and environmental personalization of various rooms and/or areas of the building.

SUMMARY

One implementation of the present disclosure is an environmental control system for a building. The system includes a vent configured to be connected to an air duct of the building. The vent includes one or more louvers configured to change position between an open position and a closed position to permit air from the air duct to enter a zone of the building or stop the air from entering the zone. The vent includes a vent circuit configured to operate the one or more louvers based on one or more control commands. The system includes a controller device including a processing circuit configured to receive a selection of an operating profile from predefined operating profiles for the vent, each of the predefined operating profiles indicating an intended use of the zone, determine, based on the operating profile, the one or more control commands, and cause the vent circuit to operate the one or more louvers based on the one or more control commands.

The processing circuit of the controller device is configured to communicate via a network with a user device, the user device presenting a selection interface to a user including one or more user interface elements to select one of the predefined operating profiles and receive the selection of the operating profile from the predefined operating profiles for the vent from the user device via the network.

In some embodiments, each of the predefined operating profiles is associated with one of temperature offsets. In some embodiments, the processing circuit of the controller device is configured to store a temperature setpoint for the building, generate a new temperature setpoint by applying one of the temperature offsets associated with the selection of the operating profile to the temperature setpoint, and determine the one or more control commands based on the new temperature setpoint.

In some embodiments, the predefined operating profiles include at least one of a baby room profile, a guest room profile, or an allergy sensitivity profile. In some embodiments, the baby room profile includes a first temperature setting, a first humidity setting, and a first air quality setting. In some embodiments, the guest room profile includes a custom temperature setting, a custom humidity setting, and a custom air quality setting. In some embodiments, the allergy sensitivity profile includes a second air quality setting.

In some embodiments, the operating profile is an allergy sensitivity profile. In some embodiments, the vent circuit includes an air quality sensor configured to measure a pollen count of the building. In some embodiments, the processing circuit of the controller device is configured to receive the pollen count of the building from the vent circuit and determine the one or more control commands to reduce the pollen count of the building in response to the selection of the allergy sensitivity profile.

In some embodiments, wherein the vent further includes an air quality sensor configured to measure air quality of the zone. In some embodiments, the vent circuit is configured to communicate the air quality to the controller device. In some embodiments, the controller device is configured to receive the air quality from the vent circuit and determine, based on the air quality, the one or more control commands for the vent to improve the air quality of the zone.

In some embodiments, the vent further includes a peltier module including a first side and a second side. In some embodiments, the first side is in contact with the air. In some embodiments, the first side is configured to perform at least one of heating the air or cooling the air. In some embodiments, the vent circuit is configured to operate the one or more louvers based on the one or more control commands and to operate the peltier module based on the one or more control commands, wherein operation of the one or more louvers and operation of the peltier module causes a temperature of the zone to be a particular temperature.

In some embodiments, the vent further includes a local heating module configured to heat the air. In some embodiments, the local heating module is a resistive heating circuit configured to heat the air by converting electrical energy into heat. In some embodiments, the vent circuit is configured to operate the local heating module to heat the air to cause a temperature of the zone to reach a setpoint temperature.

In some embodiments, the controller device configured to receive an occupant schedule indicating whether the zone will be occupied at a particular time in the future and cause the vent circuit to operate the one or more louvers a predefined amount of time before the particular time in the future based on the one or more control commands to cause a temperature of the zone to be a desired temperature at the particular time in the future.

In some embodiments, the controller device configured to generate one or more constraints for the vent, generate an objective function, the objective function indicating comfort of occupants in the zone and cost associated with operating the vent, perform an optimization of the objective function with the one or more constraints to generate the one or more control commands, wherein the one or more control commands are commands at each of multiple points of time for a future time horizon, and cause the vent circuit to operate the one or more louvers based on the one or more control commands.

In some embodiments, the vent further includes a fire detector configured to measure at least one condition. In some embodiments, the at least one condition is indicative of a fire within the building. In some embodiments, the vent circuit is configured to determine, based on the at least one condition, whether there is the fire within the building and operate the one or more louvers to stop the air from entering the zone.

In some embodiments, the vent further includes a filter device configured to filter the air and a sensor device configured to measure a condition indicative of a status of the filter device. In some embodiments, the vent circuit configured to operate the one or more louvers based on the one or more control commands, determine, based on the condition, whether the filter device needs to be replaced, and generate a filter replacement alarm in response to a determination that the filter device needs to be replaced.

Another implementation of the present disclosure is a method of an environmental control system for a building. The method includes operating, by a vent, one or more louvers of the vent between an open position and a closed position to permit air from an air duct to enter a zone of the building or stop the air from entering the zone, receiving, by a controller device, a selection of an operating profile from predefined operating profiles for the vent, each of the predefined operating profiles indicating an intended use of the zone, determining, by the controller device, based on the operating profile, one or more control commands, and operating, by the vent, the one or more louvers based on the one or more control commands.

In some embodiments, the operating profile is an allergy sensitivity profile. In some embodiments, the method includes receiving, by the vent, a pollen count of the building from an air quality sensor of the vent and determining, by the vent, the one or more control commands to reduce the pollen count of the building in response to the selection of the allergy sensitivity profile.

In some embodiments, the method further includes operating, by the vent, a peltier module of the vent based on the one or more control commands, wherein operation of the one or more louvers and operation of the peltier module causes a temperature of the zone to be a particular temperature. In some embodiments, the peltier module includes a first side and a second side, wherein the first side is in contact with the air, wherein the first side is configured to perform at least one of heating the air or cooling the air.

In some embodiments, the method includes receiving, by the controller device, an occupant schedule indicating whether the zone will be occupied at a particular time in the future and causing, by the controller device, the vent to operate the one or more louvers a predefined amount of time before the particular time in the future based on the one or more control commands to cause a temperature of the zone to be a desired temperature at the particular time in the future.

In some embodiments, the method further includes generating, by the controller device, one or more constraints for the vent, generating, by the controller device, an objective function, the objective function indicating comfort of occupants in the zone and cost associated with operating the vent, performing, by the controller device, an optimization of the objective function with the one or more constraints to generate the one or more control commands, wherein the one or more control commands are commands at each of multiple points of time for a future time horizon, and causing, by the controller device, the vent to operate the one or more louvers based on the one or more control commands.

In some embodiments, the method includes determining, by the vent, based on at least one condition, whether there is the fire within the building, wherein the vent includes a fire detector configured to measure the at least one condition, wherein the at least one condition is indicative of a fire within the building and operating, by the vent, the one or more louvers to stop the air from entering the zone.

In some embodiments, the method further includes determining, by the vent, based on a condition, whether a filter device of the vent configured to filter the air needs to be replaced, wherein the vent includes a sensor device configured to measure the condition, wherein the condition is indicative of a status of the filter device and generating, by the vent, a filter replacement alarm in response to a determination that the filter device needs to be replaced.

Another implementation of the present disclosure is a smart vent system for a building. The system includes vents, wherein a vent of the vents is configured to be connected to an air duct of the building, the vent including one or more louvers configured to change position between an open position and a closed position to permit air from the air duct to enter a zone of the building or stop the air from entering the zone and a vent circuit configured to operate the one or more louvers based on one or more control commands. The system includes a thermostat including a processing circuit configured to receive a selection of an operating profile from predefined operating profiles for the vent, each of the predefined operating profiles indicating an intended use of the zone, determine, based on the operating profile, the one or more control commands, and cause the vent circuit to operate the one or more louvers based on the one or more control commands.

Smart Vent with Local Profiles

One implementation of the present disclosure is an environmental control system for a building. The system includes a vent configured to be connected to an air duct of the building. The vent includes one or more louvers configured to change position between an open position and a closed position to permit air from the air duct to enter a zone of the building or stop the air from entering the zone and a vent circuit configured to operate the one or more louvers based on one or more control commands. The system includes a controller device including a processing circuit configured to receive a selection of an operating profile from a predefined operating profiles for the vent, each of the predefined operating profiles indicating an intended use of the zone, determine, based on the selected operating profile, the one or more control commands, and cause the vent circuit to operate the one or more louvers based on the one or more control commands.

In some embodiments, the processing circuit of the controller device is configured to communicate via a network with a user device, the user device presenting a selection interface to a user including one or more user interface elements to select one of the operating profiles. In some embodiments, the processing circuit of the controller device is configured to receive the selection of the operating profile from the predefined operating profiles for the vent from the user device via the network.

In some embodiments, the controller device includes a user interface. In some embodiments, the processing circuit of the controller device is configured to cause the user interface to display a selection interface including one or more user interface elements to select one of the operating profiles and receive, via the user interface, the selection of the operating profile from the predefined operating profiles for the vent.

In some embodiments, each of the operating profiles is associated with one of multiple temperature offsets. In some embodiments, the processing circuit of the controller device is configured to store a temperature setpoint for the building, generate a new temperature setpoint by applying one of the temperature offsets associated with the selection of the operating profile to the temperature setpoint, and determine the one or more control commands based on the new temperature setpoint.

In some embodiments, the predefined operating profiles include at least one of a baby room profile, a guest room profile, and an allergy sensitivity profile. In some embodiments, the baby room profile includes a first temperature setting, a first humidity setting, and a first air quality setting. In some embodiments, the guest room profile includes a custom temperature setting, a custom humidity setting, and a custom air quality setting. In some embodiments, wherein the allergy sensitivity profile includes a second air quality setting.

In some embodiments, the selection of the operating profile is a selection of an allergy sensitivity profile. In some embodiments, the vent circuit includes an air quality sensor configured to measure a pollen count of the building. In some embodiments, the processing circuit of the controller device is configured to receive the pollen count of the building from the vent circuit and determine the one or more control commands to reduce the pollen count of building in response to the selection of the allergy sensitivity profile.

Smart Vent with Air Quality Features

Another implementation of the present disclosure is an environmental control system for a building. The system includes a vent configured to be connected to an air duct of the building. The vent includes one or more louvers configured to change position between an open position and a closed position to permit air from the air duct to enter a zone of the building or stop the air from entering the zone. The vent includes an air quality sensor configured to measure air quality of the zone and a vent circuit configured to operate the one or more louvers based on one or more control commands and to communicate the measured air quality to a controller device. The system includes the controller device configured to receive the measured air quality from the vent circuit, determine, based on the measured air quality, one or more control commands for the vent to improve the air quality of the zone, and cause the vent circuit to operate the one or more louvers based on the one or more control commands.

In some embodiments, the vent circuit is configured to determine whether the air quality of the zone is at a dangerous level based on measured air quality, generate an alarm in response to a determination that the air quality of the zone is at the dangerous level, and override the one or more control commands and cause the one or more louvers to move to the open position in response to the determination that the air quality of the zone is at the dangerous level.

In some embodiments, the air quality of the zone is at least one of a carbon dioxide level of the zone or a carbon monoxide level of the zone.

In some embodiments, the controller device is configured to receive an outdoor air quality level, determine whether the outdoor air quality level is greater than a first predefined amount, determine whether the measured air quality of the zone is less than a second predefined amount, and determine the one or more control commands to cause outdoor air from outside the building to enter the zone in response to a determination that the outdoor air quality level is greater than the predefined amount and in response to a determination that the measured air quality of the zone is less than the second predefined amount.

In some embodiments, the controller device is configured to receive an outdoor air quality level, determine whether the outdoor air quality level is greater than a predefined amount, and determine the one or more control commands to restrict outdoor air from outside the building from entering the zone in response to a determination that the outdoor air quality level is less than the predefined amount.

In some embodiments, the controller device is configured to determine, based on the measured air quality, one or more control commands to recirculate air throughout the building, cause the vent circuit to operate the one or more louvers in the open position, and cause a supply fan to operate causing air to circulate through the building through the one or more louvers into the zone.

In some embodiments, the system further includes a remote air quality sensor located in the zone configured to measure the air quality of the zone and communicate the air quality to the controller device. In some embodiments, the remote sensor is at least one of a wall mounted sensor or a sensor incorporated into a light switch device.

In some embodiments, the vent circuit further includes a power connector connecting the vent circuit to a building power supply, an Ethernet connector connecting the vent circuit to a Power over Ethernet (PoE) network, and a power circuit. The power circuit is configured to power the vent circuit based on power of the building power supply received from the power connector, determine whether the building power supply is unavailable, and power the vent circuit based on PoE received from the PoE network in response to a determination that the building power supply is unavailable.

Smart Vent with Local Peltier Based Heating and Cooling

Another implementation of the present disclosure is an environmental control system for a building. The system includes a vent configured to be connected to an air duct of the building. The vent includes one or more louvers configured to change position between an open position and a closed position to permit air from the air duct to enter a zone of the building or stop the air from entering the zone, a peltier module including a first side and a second side, wherein the first side is in contact with the air, wherein the first side is configured to perform at least one of heating the air or cooling the air, and a vent circuit configured to operate the one or more louvers based on one or more control commands and to operate the peltier module based on the one or more control commands, wherein operation of the one or more louvers and operation of the peltier module causes a temperature of the zone to be a particular temperature.

In some embodiments, the peltier module is a reversible peltier cartridge configured to be inserted into a receiver device. In some embodiments, the vent includes the receiver device, wherein the receiver device is configured to hold the reversible peltier cartridge, wherein the reversible peltier cartridge is configured to be inserted into the receiver device in a first orientation and a second orientation. In some embodiments, the reversible peltier cartridge is configured to heat the air in response to being inserted into the receiver device in the first orientation. In some embodiments, the reversible peltier cartridge is configured to cool the air in response to being inserted into the receiver device in the second orientation.

In some embodiments, the peltier module is configured to heat the air. In some embodiments, the vent further includes a second peltier module configured to cool the air.

Smart Vent with Local Heating

Another implementation of the present disclosure is an environmental control system for a building. The system includes a vent configured to be connected to an air duct of the building. The vent includes one or more louvers configured to change position between an open position and a closed position to permit air from the air duct to enter a zone of the building or stop the air from entering the zone, a local heating module configured to heat the air, and a vent circuit configured to operate the local heating module to heat the air to cause a temperature of the zone to reach a setpoint temperature.

In some embodiments, the heating module is a resistive heating circuit configured to heat the air by converting electrical energy into heat.

Smart Vent with Scheduling and Occupancy

Another implementation of the present disclosure is an environmental control system for a building. The system includes a vent configured to be connected to an air duct of the building. The vent includes one or more louvers configured to permit air from the air duct to enter a zone of the building or stop the air from entering the zone and a vent circuit configured to operate the one or more louvers based on one or more control commands. The system includes a controller device configured to receive an occupant schedule indicating whether the zone will be occupied at a particular time in the future and cause the vent circuit to operate the one or more louvers a predefined amount of time before the particular time in the future based on the one or more control commands to cause a temperature of the zone to be a desired temperature at the particular time in the future.

In some embodiments, the controller device is configured to receive the occupant schedule from an occupant calendar server storing the occupant schedule data, wherein the calendar data is associated with the occupant.

In some embodiments, the controller device is configured to receive a second schedule associated with a second occupant, wherein the occupant schedule is associated with the occupant and generate the one or more control commands based on at least one of the occupant schedule and the second schedule and further based on a priority list, the priority list indicating a priority level of occupants including the occupant and the second occupant.

In some embodiments, the controller device is configured to receive a television interest of the occupant, receive a television schedule associated with the television interest of the occupant, identify one or more television program times based on the received television schedule, and generate the one or more control commands based on the one or more television program times.

In some embodiments, the controller device is configured to receive a location associated with a mobile device of the occupant, determine whether the location is within a geofence, and generate the one or more control commands based on whether the location is within the geofence.

In some embodiments, the controller device is configured to receive one or more images of occupants from the smart door-bell by communicating with the smart door bell, the smart door-bell including a camera device capturing the one or more imagers of the occupants, determine a number of the occupants based on the one or more images, and generate the one or more control commands based on the number of the occupants.

In some embodiments, the controller device is configured to receive, from one or more door sensors, indications of one or more doors of the building opening or closing, determine an occupancy level based on the indications of the one or more doors, and generate the one or more control commands based on the occupancy level.

In some embodiments, the controller device is configured to receive at least one of an indication of a vacation schedule or an indication to operate in a vacation mode and generate the one or more control commands based on at least one of the indication of the vacation schedule or the indication to operate in the vacation mode.

In some embodiments, the vent further includes a microphone, wherein the vent circuit is configured to record audio data via the microphone and communicate the audio data to the controller device, wherein the audio data is based on sound created by occupants. In some embodiments, the controller device is configured to receive the audio data from the vent, determine, based on the audio data, the number of the occupants, and generate the one or more control commands based on the audio data.

In some embodiments, the vent further includes a light sensor configured to detect light intensity, wherein the vent circuit is configured to communicate the detected light intensity to the controller device. In some embodiments, the controller device is configured to receive detected light intensity from the vent circuit and operate one or more shade systems based on the detected light intensity.

Smart Vent with Model Predictive Control

Another implementation of the present disclosure is an environmental control system for a building. The system includes a vent configured to be connected to an air duct of the building. The vent includes one or more louvers configured to change position between an open position and a closed position to permit air from the air duct to enter a zone of the building or stop the air from entering the zone. The vent includes a vent circuit configured to operate the one or more louvers based on one or more control commands. The system includes a controller device configured to generate one or more constraints for the vent device, generate an objective function, the objective function indicating comfort of occupants in the zone and cost associated with operating the vent device, perform an optimization of the objective function with the one or more constraints to generate the one or more control commands, wherein the one or more control commands are commands at each of multiple points of time for a future time horizon, and cause the vent circuit to operate the one or more louvers based on the one or more control commands.

Smart Vent for Fire Control

Another implementation of the present disclosure is a vent connected to an air duct of a building. The vent includes one or more louvers configured to change position between an open position and a closed position to permit air from the air duct to enter a zone of the building or stop the air from the air duct from entering the zone. The vent includes a vent circuit configured to operate the one or more louvers based on one or more control commands. The vent includes a fire detector configured to measure at least one condition, wherein the measured condition is indicative of a fire within the building. The system includes a vent circuit configured to determine, based on the measured conditions, whether there is the fire within the building and operate the one or more louvers to stop the air from entering the zone.

In some embodiments, the fire detector is a smoke detector configured to detect whether a fire is present in the building based on smoke. In some embodiments, the vent circuit is configured to determine, based on the smoke detector, whether the fire is present in the building and operate the one or more louvers to stop the air from entering the zone in response to a determination that the fire is present in the building.

In some embodiments, the vent circuit is configured to receive an indication of a presence of a fire in the building from a smoke detector by communicating with the smoke detector via a network and operate the one or more louvers to stop the air from entering the zone in response to a reception of the indication of the presence of the fire.

Smart Vent with a Local Filter and System Filter Reminders

Another implementation of the present disclosure is a vent connected to an air duct of a building. The vent includes one or more louvers configured to change position between an open position and a closed position to permit air from the air duct to enter a zone of the building or stop the air from the air duct from entering the zone and a filter device configured to filter the air. The vent includes a sensor device configured to measure a condition indicative of a status of the filter device and a vent circuit. The vent circuit is configured to operate the one or more louvers based on one or more control commands, determine, based on the measured condition, whether the filter device needs to be replaced, and generate a filter replacement alarm in response to a determination that the filter device needs to be replaced.

In some embodiments, the condition is further indicative of a status of a second filter device, the second filter device associated with a building system configured to cause the air to flow within the air duct. In some embodiments, the vent circuit is configured to determine, based on the measured condition, whether the second filter device needs to be replaced and generate a second filter replacement alarm in response to a determination that the second filter device needs to be replaced.

In some embodiments, the vent circuit is configured to determine whether the air duct is blocked based on the measured condition.

In some embodiments, the vent circuit is configured to communicate with a maintenance server to schedule a time for a technician to service the duct, perform duct cleaning, or replace the filter.

In some embodiments, the measured condition is airflow within the duct. In some embodiments, the vent circuit is configured to determine at least one of whether the filter needs to be replaced or whether the duct is blocked.

In some embodiments, the vent circuit is configured to receive an indoor air quality value indicating air quality within the zone, an outdoor air quality value indication air quality outside the building, and determine whether the filter needs to be replaced based on the indoor air quality value and the outdoor air quality value.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 14 is a flow diagram of a process for operating a smart vent of the smart vent system of FIG. 7 with vent profiles, according to an exemplary embodiment.

FIG. 15 is a flow diagram of a process for performing air quality control by a smart vent of the smart vent system of FIG. 7, according to an exemplary embodiment.

FIG. 16 is a flow diagram of a process for performing shade control based on a light sensor of a vent of the smart vent system of FIG. 7, according to an exemplary embodiment.

FIG. 19 is a flow diagram of a process for performing model predictive control with a vent of the smart vent system of FIG. 7, according to an exemplary embodiment.

FIG. 20 is a flow diagram of a process for performing scheduling and occupancy based control by a vent of the smart vent system of FIG. 7, according to an exemplary embodiment.

FIG. 22 is a flow diagram of a process of performing collaborative temperature control by the thermostat and a vent of the smart vent system of FIG. 7, according to an exemplary embodiment.

DETAILED DESCRIPTION

Building Management System and HVAC System

Referring generally to the FIGURES, a smart vent system for localized air quality control is shown, according to various exemplary embodiments. A smart vent system can be a system including a thermostat and/or multiple vents. The vents can be communicably coupled to the thermostat via a communications network. The thermostat and the vents can operate together or independently to cause various areas of a building (e.g., rooms, floors, hallways, conference rooms, zones, etc.) to have particular environmental conditions (e.g., humidity, temperature, air quality, etc.).

The smart vent system can include multiple different vents each located in a particular area of the building. Each vent can be connected to an air duct. The air duct can provide heated and/or cooled air to each of the different vents. A heating or cooling device, e.g., a furnace, air conditioner, etc. can be configured to heat or cool air and distribute the air through the air duct via a fan. The heating or cooling device can be operated by the thermostat. Based on the heated or cooled air of the air duct, each of the vents can operate a louver to allow an amount of the heated or cooled air to enter the area of the building, causing the area of the building to become a particular value.

The vents can include local heating or cooling elements to further condition the air of the air vent that enters the area of the building associated with the particular vent. For example, various heating or cooling elements such as resistive heating elements, peltier heating modules, or peltier cooling modules can be included within the vents and used to further condition the air of the duct. In this regard, the conditioning of the vent can further assist the conditioning controlled by the thermostat to cause various areas of the building to be particular temperatures.

Each of the vents, in some embodiments, can include various sensors. For example, the sensors included in the vents could be airflow sensors, temperature sensors, air quality sensors, ambient light sensors, microphones, and/or smoke detectors. In this regard, each vent can collect environmental information, occupancy information, user commands for the area of the building that the vent is located, etc. Based on the collected information, the vents can each operate a control algorithm to open and/or close louvers of the vent, turn heating or cooling elements on or off at varying amounts, etc.

In some cases, each of the vents can operate according to a particular profile. The profile may define one or more goals for the zone and/or environmental settings for the zone. For example, a zone may be a nursery profile with special humidity, temperature, and air quality settings that would be beneficial for a young child. A user can, via a user interface, select particular zone profiles for one of multiple vents of a building.

Figure 1:
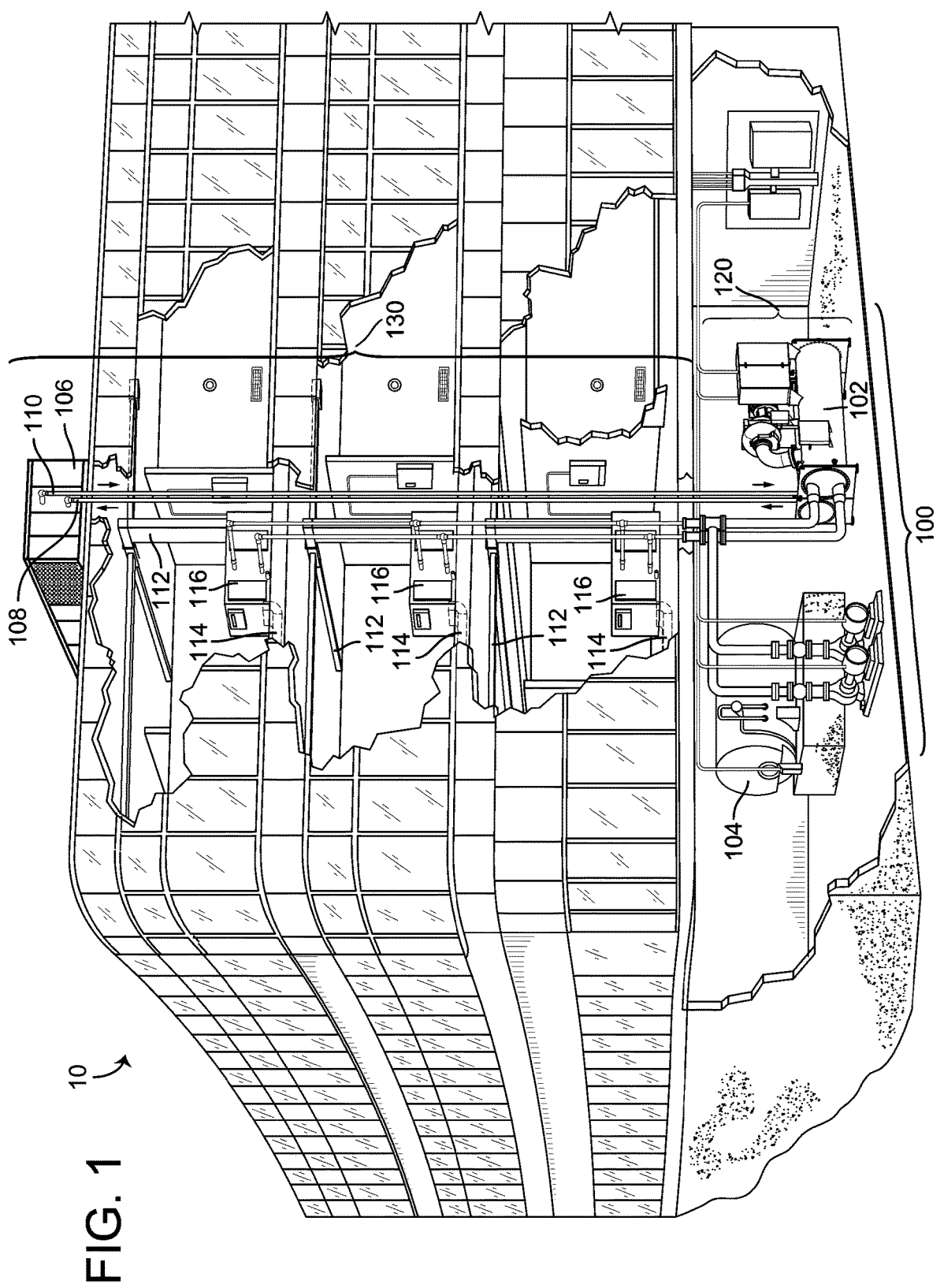
FIG. 1 is a perspective schematic drawing of a building equipped with a HVAC system, according to an exemplary embodiment.
Figure 2:
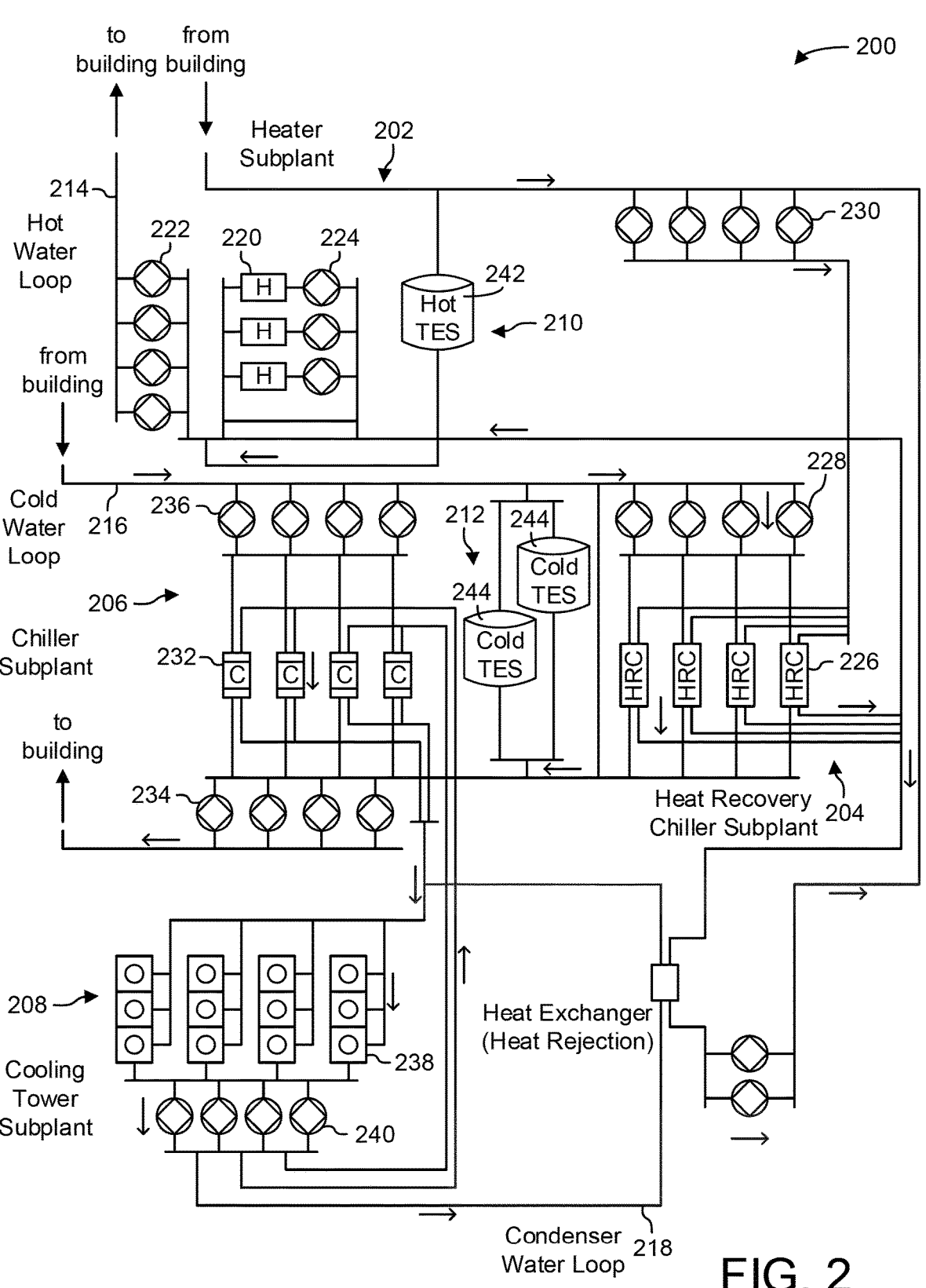
FIG. 2 is a block diagram of a waterside system that may be used in conjunction with the building of FIG. 1, according to an exemplary embodiment.
Figure 3:
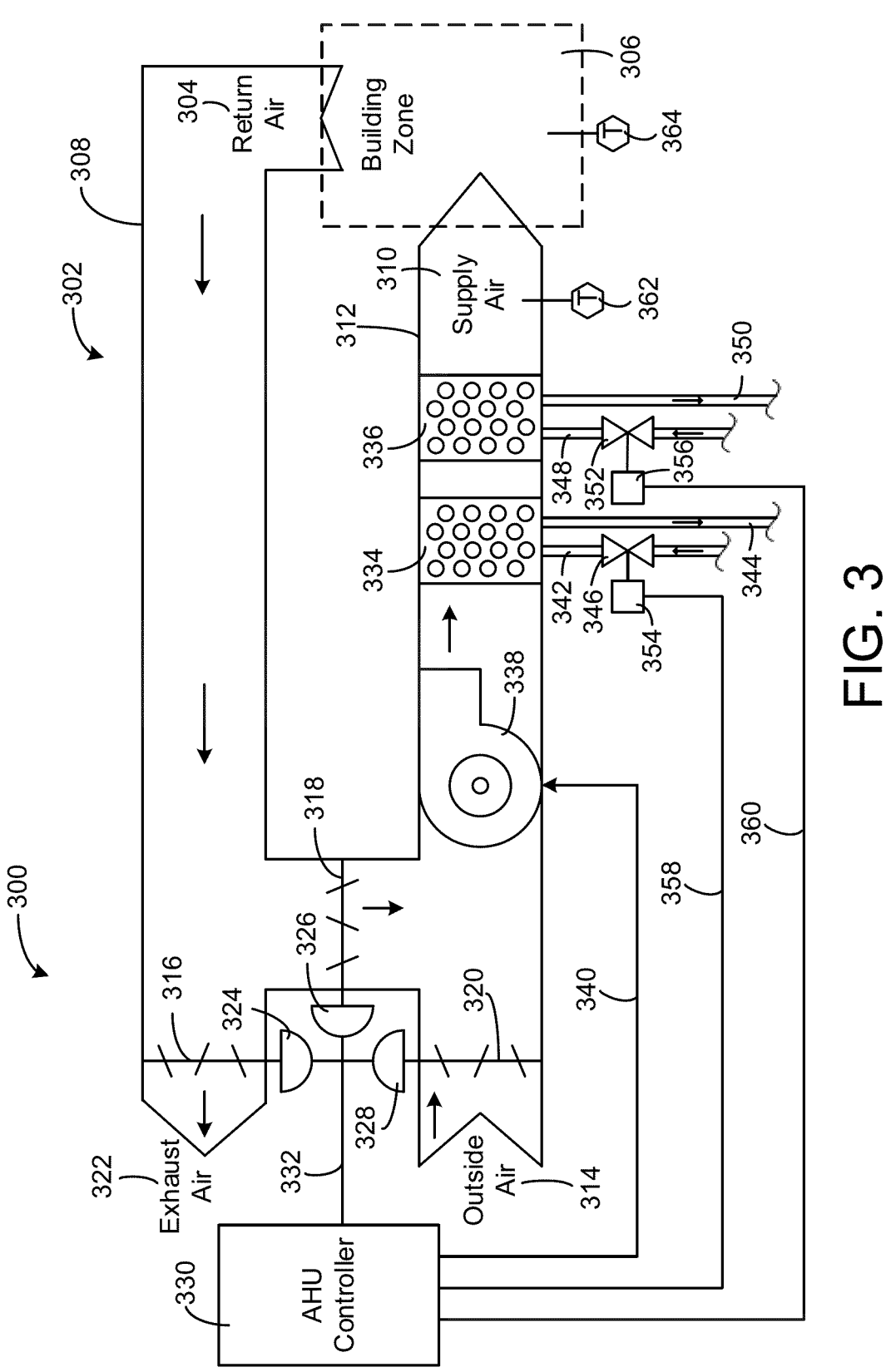
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include heating elements 220 (e.g., boilers, electric heaters, etc.) configured to add heat to the hot water in hot water loop 214.

Heater subplant 202 is also shown to include several pumps 222 and 224 configured to circulate the hot water in hot water loop 214 and to control the flow rate of the hot water through individual heating elements 220. Chiller subplant 206 is shown to include chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more humanmachine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or nonmobile device. Client device 368 can communicate with BMS controller 366 and/or AHU controller 330 via communications link 372.

17

Residential HVAC System

Figure 4:
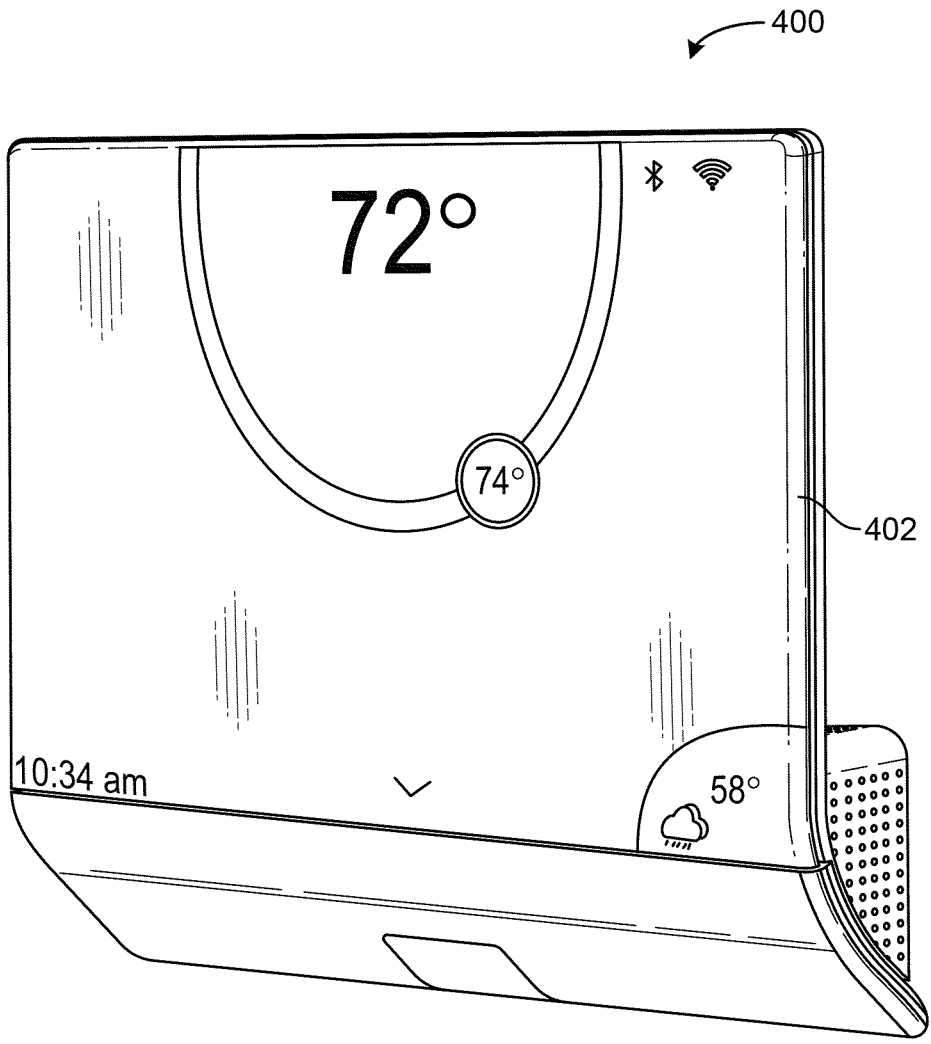
FIG. 4 is a drawing of a cantilevered thermostat with a transparent display, according to an exemplary embodiment.

Referring now to FIG. 4, a drawing of a thermostat 400 for controlling building equipment is shown, according to an exemplary embodiment. The thermostat 400 is shown to include a display 402. The display 402 may be an interactive display that can display information to a user and receive input from the user. The display may be transparent such that a user can view information on the display and view the surface located behind the display. Thermostats with transparent and cantilevered displays are described in further detail in U.S. patent application Ser. No. 15/146,649 filed May 4, 2016, the entirety of which is incorporated by reference herein.

The display 402 can be a touchscreen or other type of electronic display configured to present information to a user in a visual format (e.g., as text, graphics, etc.) and receive input from a user (e.g., via a touch-sensitive panel). For example, the display 402 may include a touch-sensitive panel layered on top of an electronic visual display. A user can provide inputs through simple or multi-touch gestures by touching the display 402 with one or more fingers and/or with a stylus or pen. The display 402 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 402 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 402 is configured to present visual media (e.g., text, graphics, etc.) without requiring a backlight.

Figure 5:
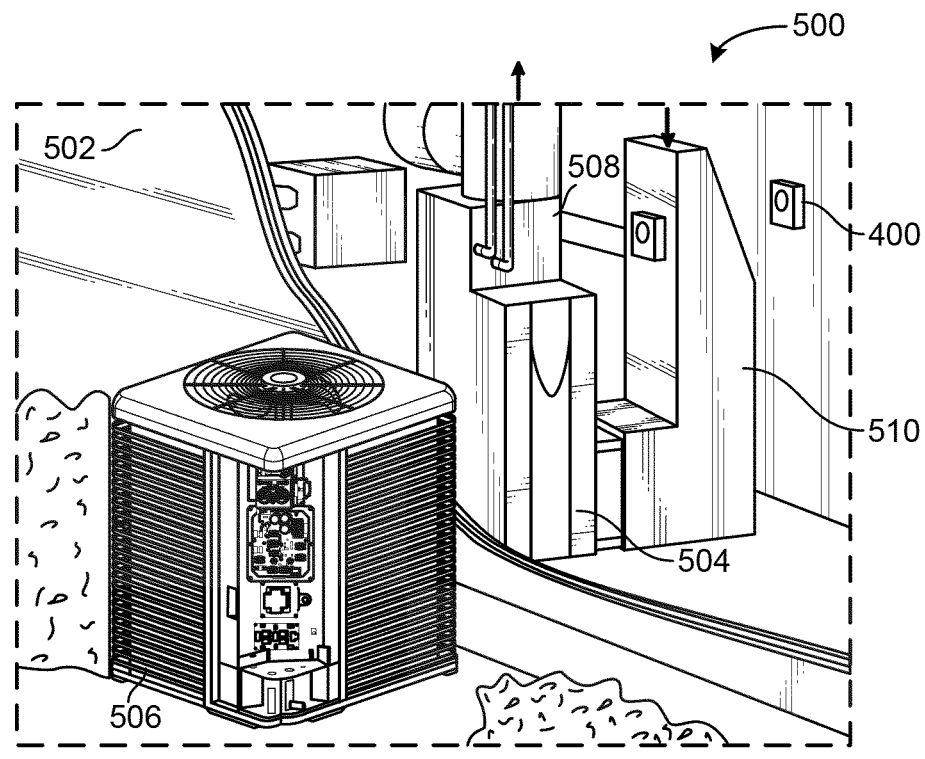
FIG. 5 is a perspective schematic drawing of a building equipped with a residential heating and cooling system and the thermostat of FIG. 4, according to an exemplary embodiment.

Referring now to FIG. 5, a residential heating and cooling system 500 is shown, according to an exemplary embodiment. The residential heating and cooling system 500 may provide heated and cooled air to a residential structure. Although described as a residential heating and cooling system 500, embodiments of the systems and methods described herein can be utilized in a cooling unit or a heating unit in a variety of applications include commercial HVAC units (e.g., roof top units). In general, a residence 502 includes refrigerant conduits that operatively couple an indoor unit 504 to an outdoor unit 506. Indoor unit 504 may be positioned in a utility space, an attic, a basement, and so forth. Outdoor unit 506 is situated adjacent to a side of residence 502. Refrigerant conduits transfer refrigerant between indoor unit 504 and outdoor unit 506, typically transferring primarily liquid refrigerant in one direction and primarily vaporized refrigerant in an opposite direction.

When the system 500 shown in FIG. 5 is operating as an air conditioner, a coil in outdoor unit 506 serves as a condenser for recondensing vaporized refrigerant flowing from indoor unit 504 to outdoor unit 506 via one of the refrigerant conduits. In these applications, a coil of the indoor unit 504, designated by the reference numeral 508, serves as an evaporator coil. Evaporator coil 508 receives liquid refrigerant (which may be expanded by an expansion device, not shown) and evaporates the refrigerant before returning it to outdoor unit 506.

Outdoor unit 506 draws in environmental air through its sides, forces the air through the outer unit coil using a fan, and expels the air. When operating as an air conditioner, the air is heated by the condenser coil within the outdoor unit 506 and exits the top of the unit at a temperature higher than it entered the sides. Air is blown over indoor coil 508 and is then circulated through residence 502 by means of ductwork 510, as indicated by the arrows entering and exiting ductwork 510. The overall system 500 operates to maintain a desired temperature as set by thermostat 400. When the temperature sensed inside the residence 502 is higher than the set point on the thermostat 400 (with the addition of a relatively small tolerance), the air conditioner will become operative to refrigerate additional air for circulation through the residence 502. When the temperature reaches the set point (with the removal of a relatively small tolerance), the unit can stop the refrigeration cycle temporarily.

In some embodiments, the system 500 configured so that the outdoor unit 506 is controlled to achieve a more elegant control over temperature and humidity within the residence 502. The outdoor unit 506 is controlled to operate components within the outdoor unit 506, and the system 500, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 6:
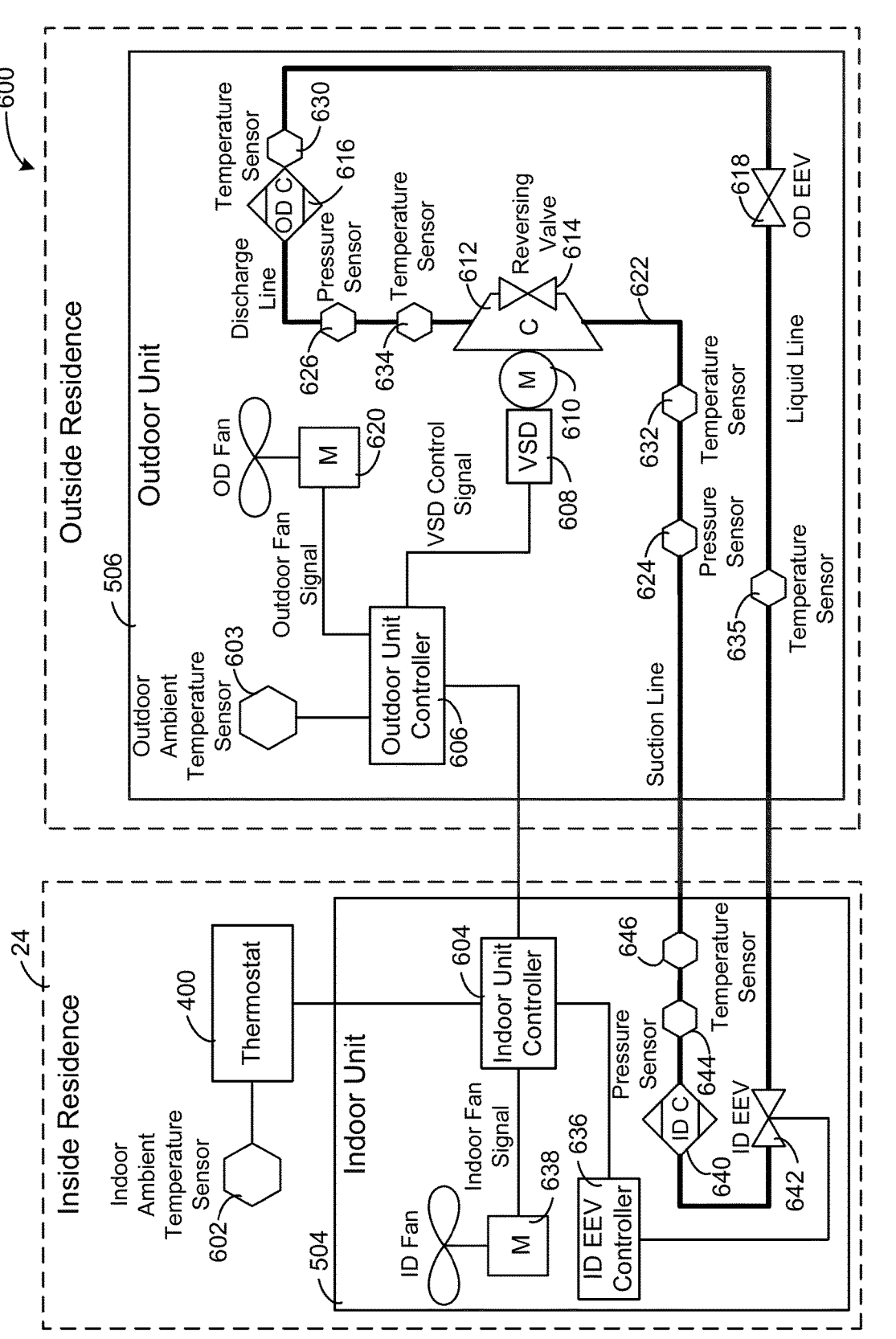
FIG. 6 is a perspective schematic drawing of the thermostat and the residential heating and cooling system of FIG. 4, according to an exemplary embodiment.

Referring now to FIG. 6, an HVAC system 600 is shown according to an exemplary embodiment. Various components of system 600 are located inside residence 502 while other components are located outside residence 502. Outdoor unit 506, as described with reference to FIG. 5, is shown to be located outside residence 502 while indoor unit 504 and thermostat 400, as described with reference to FIG. 6, are shown to be located inside the residence 502. In various embodiments, the thermostat 400 can cause the indoor unit 504 and the outdoor unit 506 to heat residence 502. In some embodiments, the thermostat 400 can cause the indoor unit 504 and the outdoor unit 506 to cool the residence 502. In other embodiments, the thermostat 400 can command an airflow change within the residence 502 to adjust the humidity within the residence 502.

The thermostat 400 can be configured to generate control signals for indoor unit 504 and/or outdoor unit 506. The thermostat 400 is shown to be connected to an indoor ambient temperature sensor 602, and an outdoor unit controller 606 is shown to be connected to an outdoor ambient temperature sensor 603. The indoor ambient temperature sensor 602 and the outdoor ambient temperature sensor 603 may be any kind of temperature sensor (e.g., thermistor, thermocouple, etc.). The thermostat 400 may measure the temperature of residence 502 via the indoor ambient temperature sensor 602. Further, the thermostat 400 can be configured to receive the temperature outside residence 502 via communication with the outdoor unit controller 606. In various embodiments, the thermostat 400 generates control signals for the indoor unit 504 and the outdoor unit 506 based on the indoor ambient temperature (e.g., measured via indoor ambient temperature sensor 602), the outdoor temperature (e.g., measured via the outdoor ambient temperature sensor 603), and/or a temperature set point.

The indoor unit 504 and the outdoor unit 506 may be electrically connected. Further, indoor unit 504 and outdoor unit 506 may be coupled via conduits 622. The outdoor unit 506 can be configured to compress refrigerant inside conduits 622 to either heat or cool the building based on the operating mode of the indoor unit 504 and the outdoor unit 506 (e.g., heat pump operation or air conditioning operation). The refrigerant inside conduits 622 may be any fluid that absorbs and extracts heat. For example, the refrigerant may be hydro fluorocarbon (HFC) based R-410A, R-407C, and/or R-134a.

The outdoor unit 506 is shown to include the outdoor unit controller 606, a variable speed drive 608, a motor 610 and a compressor 612. The outdoor unit 506 can be configured to control the compressor 612 and to further cause the compressor 612 to compress the refrigerant inside conduits 622. In this regard, the compressor 612 may be driven by the variable speed drive 608 and the motor 610. For example, the outdoor unit controller 606 can generate control signals for the variable speed drive 608. The variable speed drive 608 (e.g., an inverter, a variable frequency drive, etc.) may be an AC-AC inverter, a DC-AC inverter, and/or any other type of inverter. The variable speed drive 608 can be configured to vary the torque and/or speed of the motor 610 which in turn drives the speed and/or torque of compressor 612. The compressor 612 may be any suitable compressor such as a screw compressor, a reciprocating compressor, a rotary compressor, a swing link compressor, a scroll compressor, or a turbine compressor, etc.

In some embodiments, the outdoor unit controller 606 is configured to process data received from the thermostat 400 to determine operating values for components of the system 600, such as the compressor 612. In one embodiment, the outdoor unit controller 606 is configured to provide the determined operating values for the compressor 612 to the variable speed drive 608, which controls a speed of the compressor 612. The outdoor unit controller 606 is controlled to operate components within the outdoor unit 506, and the indoor unit 504, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 606 can control a reversing valve 614 to operate system 600 as a heat pump or an air conditioner. For example, the outdoor unit controller 606 may cause reversing valve 614 to direct compressed refrigerant to the indoor coil 508 while in heat pump mode and to an outdoor coil 616 while in air conditioner mode. In this regard, the indoor coil 508 and the outdoor coil 616 can both act as condensers and evaporators depending on the operating mode (i.e., heat pump or air conditioner) of system 600.

Further, in various embodiments, outdoor unit controller 606 can be configured to control and/or receive data from an outdoor electronic expansion valve (EEV) 518. The outdoor electronic expansion valve 518 may be an expansion valve controlled by a stepper motor. In this regard, the outdoor unit controller 606 can be configured to generate a step signal (e.g., a PWM signal) for the outdoor electronic expansion valve 518. Based on the step signal, the outdoor electronic expansion valve 518 can be held fully open, fully closed, partial open, etc. In various embodiments, the outdoor unit controller 606 can be configured to generate step signal for the outdoor electronic expansion valve 518 based on a subcool and/or superheat value calculated from various temperatures and pressures measured in system 600. In one embodiment, the outdoor unit controller 606 is configured to control the position of the outdoor electronic expansion valve 518 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 606 can be configured to control and/or power outdoor fan 620. The outdoor fan 620 can be configured to blow air over the outdoor coil 616. In this regard, the outdoor unit controller 606 can control the amount of air blowing over the outdoor coil 616 by generating control signals to control the speed and/or torque of outdoor fan 620. In some embodiments, the control signals are pulse wave modulated signals (PWM), analog voltage signals (i.e., varying the amplitude of a DC or AC signal), and/or any other type of signal. In one embodiment, the outdoor unit controller 606 can control an operating value of the outdoor fan 620, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 506 may include one or more temperature sensors and one or more pressure sensors. The temperature sensors and pressure sensors may be electrical connected (i.e., via wires, via wireless communication, etc.) to the outdoor unit controller 606. In this regard, the outdoor unit controller 606 can be configured to measure and store the temperatures and pressures of the refrigerant at various locations of the conduits 622. The pressure sensors may be any kind of transducer that can be configured to sense the pressure of the refrigerant in the conduits 622. The outdoor unit 506 is shown to include pressure sensor 624. The pressure sensor 624 may measure the pressure of the refrigerant in conduit 622 in the suction line (i.e., a predefined distance from the inlet of compressor 612). Further, the outdoor unit 506 is shown to include pressure sensor 626. The pressure sensor 626 may be configured to measure the pressure of the refrigerant in conduits 622 on the discharge line (e.g., a predefined distance from the outlet of compressor 612).

The temperature sensors of outdoor unit 506 may include thermistors, thermocouples, and/or any other temperature sensing device. The outdoor unit 506 is shown to include temperature sensor 630, temperature sensor 632, temperature sensor 634, and temperature sensor 635. The temperature sensors (i.e., temperature sensor 630, temperature sensor 632, temperature sensor 635, and/or temperature sensor 646) can be configured to measure the temperature of the refrigerant at various locations inside conduits 622.

Referring now to the indoor unit 504, the indoor unit 504 is shown to include indoor unit controller 604, indoor electronic expansion valve controller 636, an indoor fan 638, an indoor coil 640, an indoor electronic expansion valve

642, a pressure sensor 644, and a temperature sensor 646. The indoor unit controller 604 can be configured to generate control signals for indoor electronic expansion valve controller 636. The signals may be set points (e.g., temperature set point, pressure set point, superheat set point, subcool set point, step value set point, etc.). In this regard, indoor electronic expansion valve controller 636 can be configured to generate control signals for indoor electronic expansion valve 642. In various embodiments, indoor electronic expansion valve 642 may be the same type of valve as outdoor electronic expansion valve 618. In this regard, indoor electronic expansion valve controller 636 can be configured to generate a step control signal (e.g., a PWM wave) for controlling the stepper motor of the indoor electronic expansion valve 642. In this regard, indoor electronic expansion valve controller 636 can be configured to fully open, fully close, or partially close the indoor electronic expansion valve 642 based on the step signal.

Indoor unit controller 604 can be configured to control indoor fan 638. The indoor fan 638 can be configured to blow air over indoor coil 640. In this regard, the indoor unit controller 604 can control the amount of air blowing over the indoor coil 640 by generating control signals to control the speed and/or torque of the indoor fan 638. In some embodiments, the control signals are pulse wave modulated signals (PWM), analog voltage signals (i.e., varying the amplitude of a DC or AC signal), and/or any other type of signal. In one embodiment, the indoor unit controller 604 may receive a signal from the outdoor unit controller indicating one or more operating values, such as speed for the indoor fan 638. In one embodiment, the operating value associated with the indoor fan 638 is an airflow, such as cubic feet per minute (CFM). In one embodiment, the outdoor unit controller 606 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 604 may be electrically connected (e.g., wired connection, wireless connection, etc.) to pressure sensor 644 and/or temperature sensor 646. In this regard, the indoor unit controller 604 can take pressure and/or temperature sensing measurements via pressure sensor 644 and/or temperature sensor 646. In one embodiment, pressure sensor 644 and temperature sensor 646 are located on the suction line (i.e., a predefined distance from indoor coil 640). In other embodiments, the pressure sensor 644 and/or the temperature sensor 646 may be located on the liquid line (i.e., a predefined distance from indoor coil 640). Smart Vent System Referring now to FIG. 7, a building 700 is shown including a smart vent system configured to control environmental conditions of the building 700, according to an exemplary embodiment. The building 700 can be the same as and/or similar to the building 10 as described with reference to FIG. 1 or the residence 502 as described with reference to FIG. 5. The building 700 can include an HVAC system for heating or cooling the building 700. The HVAC system can include some and/or all of the HVAC devices as described with reference to FIGS. 1-6. For example, the building 700 is shown to include the outdoor unit 506 as described with reference to FIGS. 5-6, the indoor unit 504 including the indoor fan 638 as described with reference to FIG. 6.

The building 10 is shown to include an exhaust fan 710 configured to exhaust air from a zone 1 of the building 700. The building 700 is further shown to include a second zone, zone 2, and a basement although the building 700 can include any number of zones, floors, and/or areas. Zone 1 is shown to include a smart vent 708 while zone 2 is shown to include a smart vent 706. The smart vents 708 and 706 can be configured to control the environmental conditions of zones 1 and 2 respectively based on conditioned (e.g., heated or cooled) air that flows through duct 704. Examples of an exhaust fan and systems for controller an exhaust fan can be found in U.S. patent application Ser. No. 15/953,166 filed Apr. 13, 2018, the entirety of which is incorporated by reference herein.

The air of the duct 704 used by the smart vents 708 and 706 can be circulated by the indoor fan 638 and can be heated or cooled by the indoor unit 504. The air of the duct 704 can be outdoor air that enters the building 700 via an inlet 702 and/or can be recirculated air that recirculates through the building 700 back to the indoor unit 504 via duct 705.

The building 700 is shown to include the thermostat 400 as described with reference to FIG. 4. The thermostat 400 can be configured to receive setpoints (e.g., temperature setpoints, humidity setpoints, environmental lighting parameters, etc.). Based on the received setpoints, the thermostat 400 can cause the smart vents 708 and 706 to control the environmental conditions of the zones 1 and 2. In some embodiments, the thermostat 400 receives temperature offsets for each of the vents and operate the vents based on the temperature offset, an offset applied to a temperature setpoint of the thermostat 400. Each of the smart vents 708 and 706 can be configured to open or close louvers to allow, restrict, or prevent the conditioned air of the duct 704 to flow into the zones 1 and 2, controlling the temperatures of the zones 1 and 2 independently. The thermostat 400 can be configured to communicate with the smart vents 708 and 706 via a network as described in greater detail with reference to FIG. 6. The thermostat 400 can include various sensors for measuring the environmental conditions of the area which the thermostat 400 is located. Examples of environmental condition sensors may be temperature, humidity, air quality, etc. Examples of a thermostat with various air quality sensors can be found in U.S. Provisional Patent Application No. 62/640,654 filed Mar. 9, 2018, the entirety of which is incorporated by reference herein.

In some embodiments, the thermostat 400 generates control commands and communicates the control commands to the smart vents 704 and 706 to implement environmental control. In some embodiments, the thermostat 400 communicates a zone setpoint to the smart vents 708 and 706 and the smart vents 708 and 706 each generate respective control operations to implement the received setpoints in the zones 1 and 2. In some embodiments, the smart vents 708 and 706 can operate independently of the thermostat 400.

Figure 8:
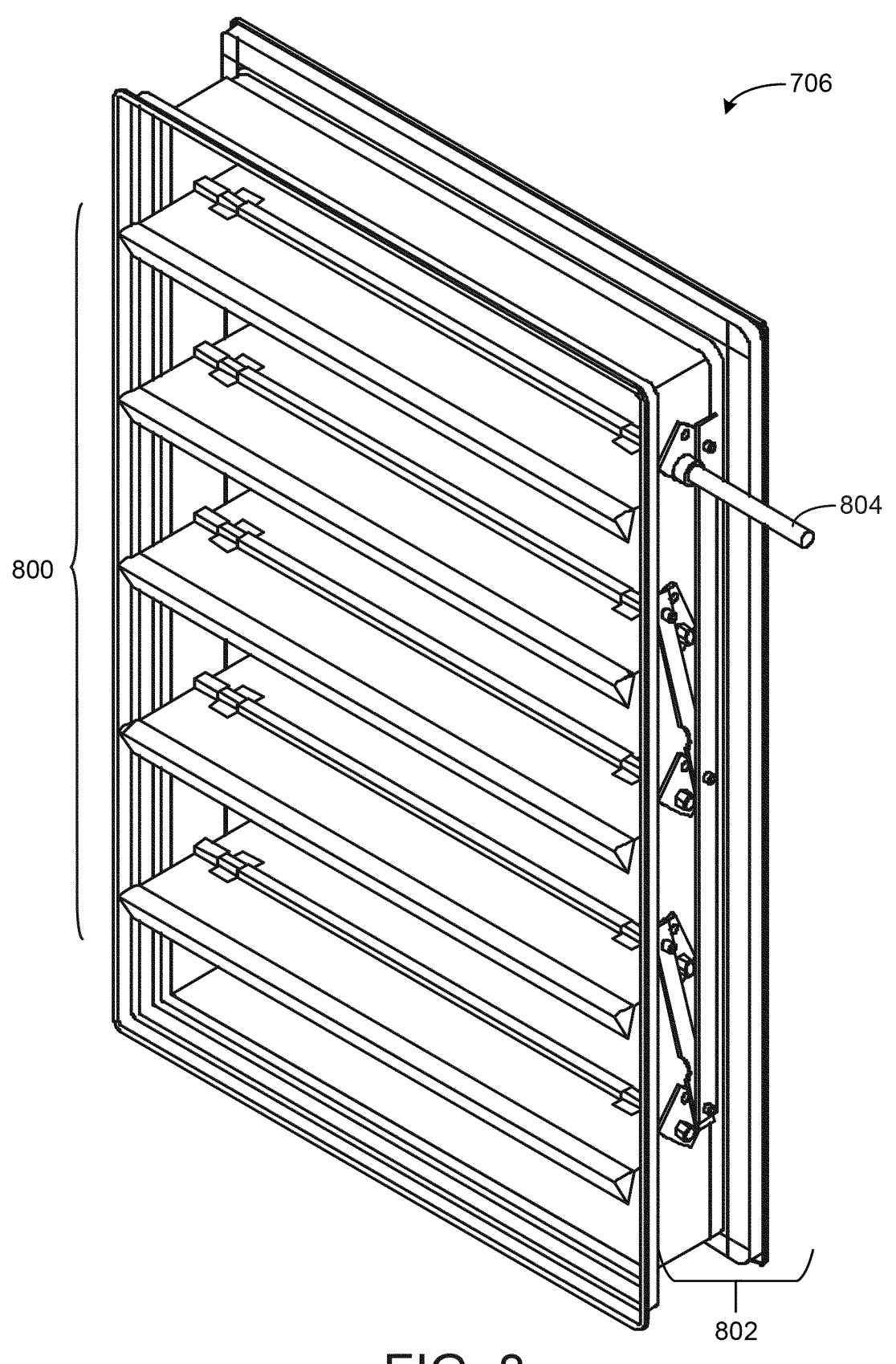
FIG. 8 is perspective schematic drawing of one of the vents of FIG. 7 in greater detail, according to an exemplary embodiment.

Referring now to FIG. 8, the smart vent 706 is shown in greater detail to include louvers, according to an exemplary embodiment. The smart vent 706 is shown to include multiple louvers 800 (may also be referred to as flaps) that can open and close to permit, restrict, or stop air from flowing into a zone. Although five louvers are shown in FIG. 8, in some embodiments, the smart vent 706 includes a single louver and/or any other number of louvers.

The smart vent 706 is shown to include louver control apparatus 802 configured to open and close the louvers 800. The louver control apparatus 802 is connected to each of the louvers 800 so that upon actuation of the louver control apparatus 802, all of the louvers can open or close together. In some embodiments, the louver control apparatus 802 is configured to operate each of the louvers 800 individually, i.e., different actuations of the louver control apparatus 802 can open and/or close a particular number of the louvers 800. The louver control apparatus 802 is shown to include a shaft 804. The shaft 804 can be coupled to a motor or other actuating device. In response to torque applied on the shaft 804, the louver control apparatus 802 can be configured to open or close the louvers 800.

Figure 9:
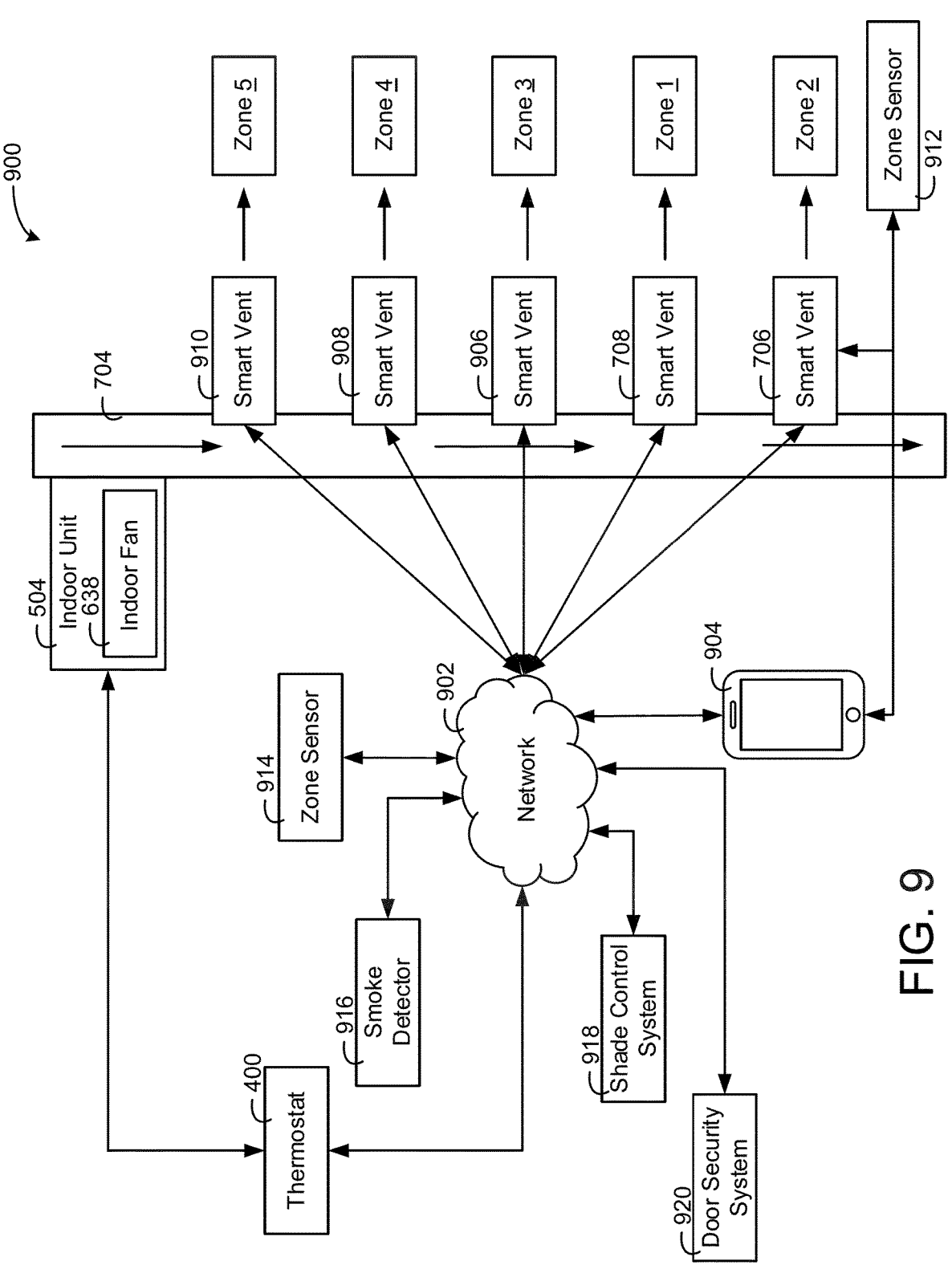
FIG. 9 is a block diagram of the smart vent system of FIG. 7 shown in greater detail, according to an exemplary embodiment.

Referring now to FIG. 9, a smart vent system 900 for controlling the environmental conditions of multiple zones with smart vents, according to an exemplary embodiment. The system 900 can be implemented in the building 700 as described with reference to FIG. 7. The system 900 is shown to include the thermostat 400, the smart vent 706, and the smart vent 708 as described with reference to FIG. 7. The system is further shown to include smart vents 806-810. Each of the smart vents 906-910, the smart vent 706, and the smart vent 708 are shown to control airflow from the duct 704 as described with reference to FIG. 7 into particular zones, i.e., the zone 1, the zone 2, and zones 3-5. More specifically, the indoor unit 504 can be configured to heat or cool air and supply the air to the duct 704 via the indoor fan 638 (e.g., a supply fan), the indoor unit 504 and the indoor fan 638 are described with further reference to FIGS. 5-6. The heated or cooled air can be allowed or prevented from entering the zones 1-5 by the smart vents 906-910, smart vent 706, and smart vent 708 so that each of the zones 1-5 can be controlled to unique environmental conditions.

The smart vent based system 900 provides localized air quality control for various zones with only requiring a single HVAC system, i.e., a single indoor unit 504. Advantageously, multiple air conditioners or heaters do not need to be installed in a building, instead, a single indoor unit can be installed and the duct of the building can be fitted with multiple smart vents.

The system 900 is shown to include a network 902. The 902 can be configured to communicably couples the devices and systems of system 900. In some embodiments, network 902 is at least one of and/or a combination of a Wi-Fi network, a wired Ethernet network, a Zigbee network, a Bluetooth network, and/or any other wireless network. Network 902 may be a local area network or a wide area network (e.g., the Internet, a building WAN, etc.) and may use a variety of communications protocols (e.g., BACnet, IP, LON, etc.). Network 404 may include communication wires or cables, routers, modems, and/or network switches. Network 902 may be a combination of wired and wireless networks.

The system 900 is further shown to include a zone sensor 912 and a zone sensor 914. The zone sensor 912 and the zone sensor 914 can be located in one of the zones 1-5. The zone sensor 912 can sense an environmental condition of the zone 2 and can directly communicate the measured condition to the smart vent 706 and/or the thermostat 400 (e.g., via short range wireless communication). Similar direct communication can be implemented between a smart light switch including various environmental sensors and the smart vent 706 and/or the thermostat 400. In some embodiments, the zone sensor 912 is integrated within the smart vent 706. The zone sensor 912 is configured to measure environmental conditions such as temperature, humidity, airflow, air quality (e.g., pollen levels, carbon monoxide levels, carbon dioxide levels, etc.), light intensity, etc., in some embodiments. The zone sensor 912 includes a communication module (e.g., a wired module or a wireless module) configured to communicate the measurements to the smart vent 706 and/or a user device 904. In this regard, the smart vent 706 can communicate measurements of the zone sensor 912 to the thermostat 400 and/or be configured to perform control operations to adjust the environmental conditions of the zone 1.

The zone sensor 914 is shown to communicate with the network 902. The zone sensor 914 can be the same as, or similar to, the zone sensor 912 and can be configured to measure the same or similar environmental conditions of one or multiple of the zones 1-5. The thermostat 400 can receive the measurements from the zone sensor 914 and can be configured to generate control decisions for one or multiple of the smart vents 906-910, smart vent 706, and/or smart vent 708. In some embodiments, the zone sensor 914 communicates environmental measurements to one or multiple of the smart vents 906-910, smart vent 706, and/or smart vent 708.

The thermostat 400 can be configured to generate control decisions for one or multiple of the smart vents 906-910, the smart vent 706, and/or the smart vent 708. The thermostat 400 can be include environmental sensors configured to measure environmental conditions of a building or zone where the thermostat 400 is located (e.g., temperature, humidity, light intensity, air quality, etc.). Furthermore, the thermostat 400 can be configured to receive outdoor environmental conditions via the network 902 from a sever, e.g., outdoor air temperature, outdoor air humidity, weather forecast, outdoor air quality, etc.

The thermostat 400 can be configured to generate the control decision for the one or multiple smart vents 906-910, the smart vent 706, and/or the smart vent 708 based on the measurements of the zone sensor 914, the measurements of the zone sensor 912, internal measurements made by the thermostat 400, and/or received outdoor environmental conditions received from a server system. The control decisions can be to perform local heating or cooling at a vent, open or close a vent, open a predefined number of louvers of a vent, close a predefined number of louvers of the vent, open a louver or multiple louvers a predefined amount, close all louvers, open one or multiple louvers fully open, etc.

The thermostat 400 can be configured to communicate the control decisions to the smart vents 906-910, the smart vent 706, and/or the smart vent 708 via the network 902. In response to receiving the control decisions, each of the smart vents 906-910, the smart vent 706, and/or the smart vent 708 can be configured to operate louvers and/or heating or cooling elements of the smart vents to implement the control decisions by the thermostat 400. In some embodiments, each of the smart vents 906-910, the smart vent 706, and/or the smart vent 708 are configured to locally determine control decisions. In this regard, the thermostat 400 and/or the user device 904 can communicate a setting to the smart vents 906-910, the smart vent 706, and/or the smart vent 708 which the smart vents 906-910, the smart vent 706, and/or the smart vent 708 can implement. The setting may be a temperature setpoint for a zone, a humidity setpoint for a zone, and air quality setpoint and/or setting for a zone, etc. Each of the smart vents 906-910, the smart vent 706, and/or the smart vent 708 can be configured to operate based on the received setpoint.

The system 900 is shown to include the user device 904. The user device 904 can include any user-operable computing device such as smartphones, tablets, laptop computers, desktop computers, wearable devices (e.g., smart watches, smart wrist bands, smart glasses, etc.), and/or any other computing device. The user device 904 can be a mobile device or a non-mobile device. The user device 904 can be configured to communicate with the devices of the system 900 via the network 902. In some embodiments, the user device 904 can control the operation of the smart vents 906-910, the smart vent 706, and/or the smart vent 708. For example, a user can provide control decisions or operating settings to the thermostat 400 and/or directly to the smart vents 906-910, the smart vent 706, and/or the smart vent 708 via the network 902. An interface that the user device 904 can be configured to display (or the thermostat 400 can be configured to display) for operating the smart vents 906-910, the smart vent 706, and/or the smart vent 708 is the interface as described with reference to FIG. 21.

The system 900 is shown to include a smoke detector 916. The smoke detector 916 can be configured to determine whether there is a fire within a building and/or within the zones 1-5. The smoke detector 916 can detect whether there is a fire based on smoke, e.g., optically (e.g., through photoelectric detection) and/or physically (e.g., ionization). In response to the smoke detector 916 detecting a fire, the smart vents 906-910, the smart vent 706, and/or the smart vent 708 can be configured to close, restricting airflow in the zones 1-5, preventing the fire from spreading. In some embodiments, the smoke detector is incorporated within, or otherwise in communication with, one of the smart vents 906-910, the smart vent 706, and/or the smart vent 708.

In some embodiments, the smart vents 906-910, the smart vent 706, and/or the smart vent 708 are configured to receive an indication of a fire from the smoke detector 916 and operate to restrict the fire by closing louvers of the smart vents 906-910, the smart vent 706, and/or the smart vent 708. In some embodiments, the thermostat 400 receives an indication of a fire from the smoke detector 916 and operates the smart vents 906-910, the smart vent 706, and/or the smart vent 708 to restrict airflow to the zones 1-5 in response to receiving the indication of the fire from the smoke detector 916.

The system 900 is shown to include a shade control system 918. The shade control system 918 can be located in one of the zones 1-5 and/or can operate shades for all or some of the zones 1-5. In some embodiments, a shade control system 918 operates shades for each of the zones 1-5. The shade control system 918 can be configured to operate a shade of a window, e.g., open the shade or close the shade, changing the amount of natural sunlight entering the zone. In some embodiments, sunlight can heat a zone. This may assist or disrupt heating or cooling a zone. Therefore, it may be beneficial to have a shade closed or open to improve the heating or cooling of the zone. For example, if a zone is at a cold temperature and needs to be heated to a higher temperature, it may be beneficial to have a window open when there is sunlight to aid in heating the zone. In some embodiments, when a zone is hot and being cooled to a particular temperature, it may be beneficial to close the shades to prevent the zone from being heated by sunlight.

The thermostat 400, the smart vents 906-910, the smart vent 706, and/or the smart vent 708, the zone sensor 914, and/or the zone sensor 912 can include, or otherwise communicate with, a light intensity sensor configured to measure a light intensity of one of the zones 1-5. Based on the light intensity level for a particular zone, a temperature of the zone, and a temperature setpoint for the zone, the thermostat 400 and/or the smart vents 906-910, the smart vent 706, and/or the smart vent 708 can be configured to operate the shade control system 918 to open or close shades of the zones 1-5. For example, if the thermostat 400 (or another device of the system 900) determines that a temperature of a zone is a predefined amount less than a temperature setpoint for the zone and an ambient light intensity is greater than a predefined amount, the thermostat 400 can cause shades of that zone to open if not already in an open position. This may indicate that the zone is trying to be heated yet it is bright outside. By opening the shade, the sunlight can be used to help heat the zone.

The system 900 includes a door security system 920. The door security system may be a camera based door bell (e.g., a smart doorbell) or another system providing security for an entrance of a building by capturing images and/or video. The images and/or video can be communicated to the thermostat 400 and/or the smart vents 906-910, the smart vent 708, and/or the smart vent 706 which in turn can be configured to process the images and/or video to determine a number of occupants approaching and/or entering the building and control environmental conditions based on the number of occupants.

Figure 7:
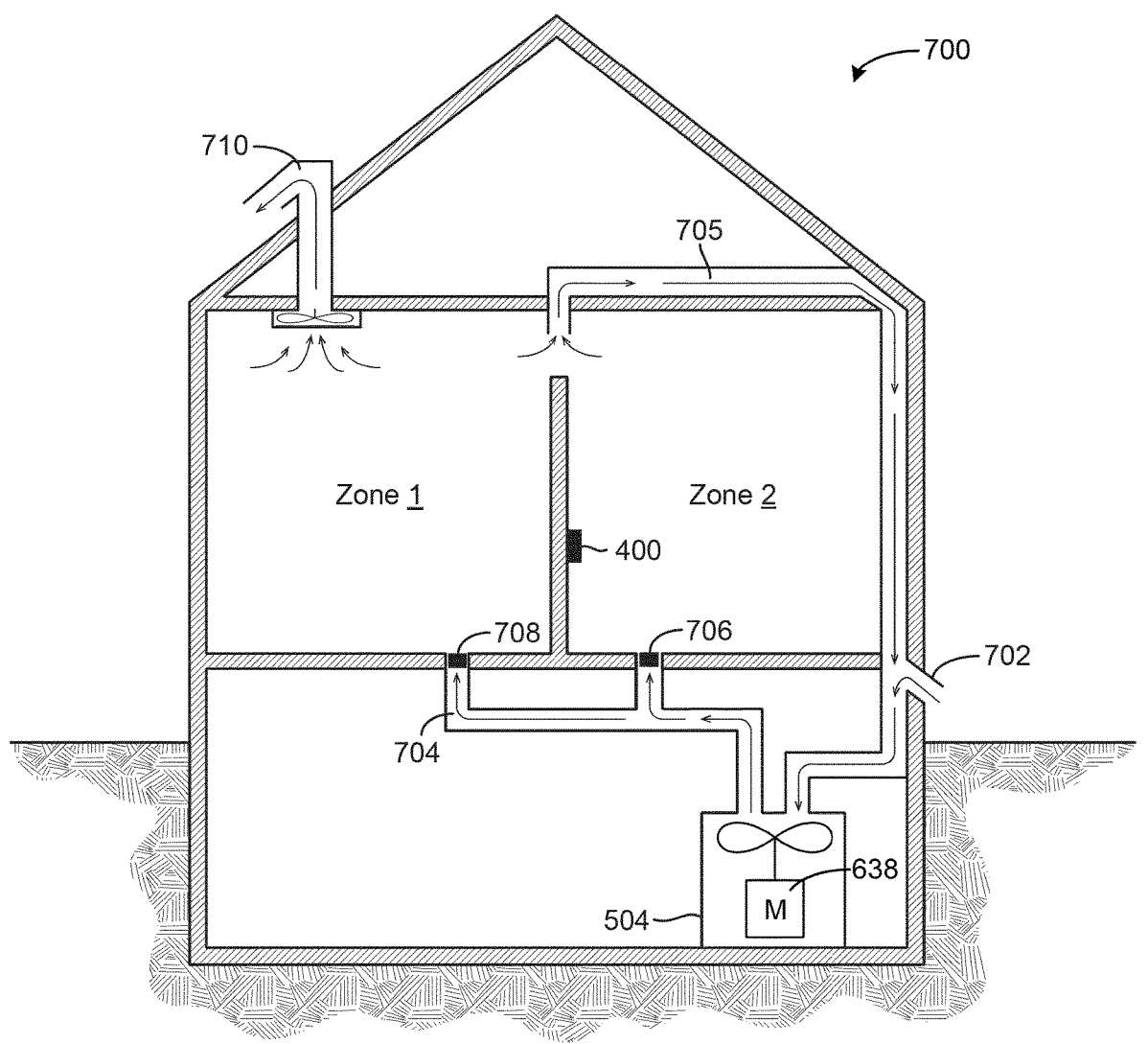
FIG. 7 is drawing of another building including a smart vent system, the smart vent system including multiple vents, according to an exemplary embodiment.
Figure 10:
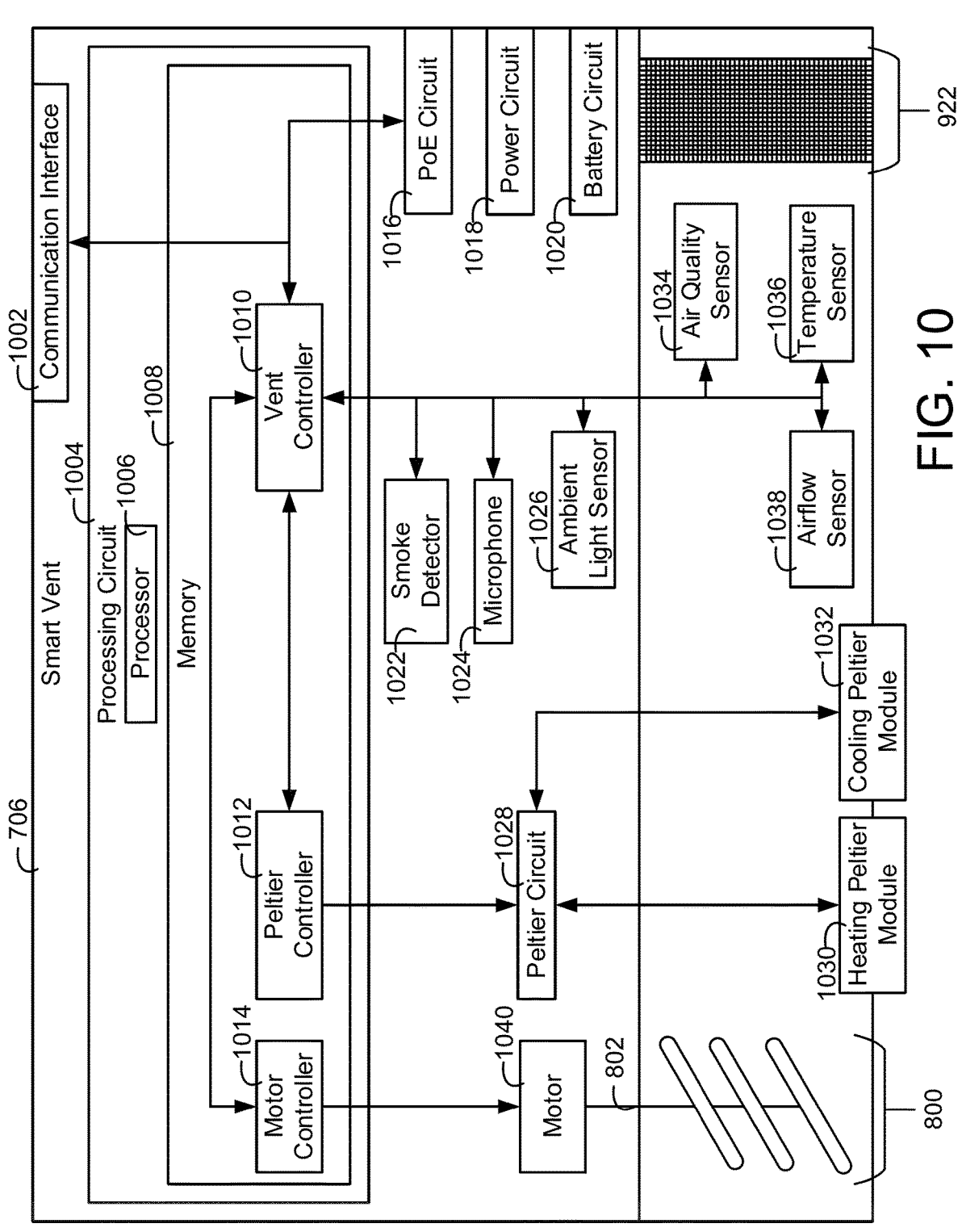
FIG. 10 is a block diagram of one of the vents of FIG. 7 shown in greater detail, according to an exemplary embodiment.

Referring now to FIG. 10, the smart vent 706 as described with reference to FIGS. 7-9 is shown in greater detail, according to an exemplary embodiment. The smart vent 706 is shown to include a communication interface 1002. The communication interface 1002 can be configured to communicate with other systems and devices, e.g., via the network 902 as described with reference to FIG. 9. The communication interface 1002 can include one or more radios, transmitters, receivers, transceivers, wired communication connectors, etc.

The smart vent 706 is shown to include a processing circuit 1004. The processing circuit 1004 is shown to include a processor 1006 and memory 1008. The processor 1006 can be a general purpose or specific purpose processor, an application specific integrated circuit (ASIC), one or more field programmable gate arrays (FPGAs), a group of processing components, or other suitable processing components. The processor 1006 can be configured to execute computer code and/or instructions stored in the memory 1008 or received from other computer readable media (e.g., CDROM, network storage, a remote server, etc.).

The memory 1008 can include one or more devices (e.g., memory units, memory devices, storage devices, etc.) for storing data and/or computer code for completing and/or facilitating the various processes described in the present disclosure. The memory 1008 can include random access memory (RAM), read-only memory (ROM), hard drive storage, temporary storage, non-volatile memory, flash memory, optical memory, or any other suitable memory for storing software objects and/or computer instructions. The memory 1008 can include database components, object code components, script components, or any other type of information structure for supporting the various activities and information structures described in the present disclosure. The memory 1008 can be communicably connected to the processor 1006 via the processing circuit 1004 and can include computer code for executing (e.g., by the processor 1006) one or more processes described herein.

The smart vent 706 is shown to include a Power over Ethernet (PoE) circuit 1016, a power circuit 1018, and a battery circuit 1020. The PoE circuit 1016 can be configured to connect to a PoE network (e.g., one or more PoE sources or other PoE devices) and receive PoE via the connection. The PoE circuit 1016 can be configured to power the smart vent 706 via the PoE received via the PoE circuit 1016. Including the PoE circuit 1016 can realize a backup power source (e.g., a power source if the power circuit 1018 and/or the battery circuit 1020 are unable to power the smart vent

706). In some embodiments, the PoE circuit 1016 can be the main source of power and/or communication for the smart vent 706 (e.g., communication via the network 902). The PoE circuit 1018 and/or the PoE network can be the same and/or similar to the circuits and networks as described with reference to U.S. patent application Ser. No. 15/956,914 filed Apr. 19, 2018, the entirety of which is incorporated by reference herein.

The power circuit 1018 can be configured to power the smart vent 706 via a connection to a building power supply. For example, the power circuit 1018 can include a connector for connecting the smart vent 706 to a power outlet, a building power supply, and/or a power supply provided by the indoor unit 504. The power circuit 1018 can be configured to receive power from the building power supply and can be configured to power the smart vent 706 based on the received power. In some embodiments, the power circuit 1018 includes various power filters, rectifiers, converters, and/or transformers to power the smart vent 706 based on the building power of the building power supply.

The battery circuit 1020 can include a battery and/or circuit configured to power the smart vent 706 based on power of the battery. The battery circuit 1020 can allow the smart vent 706 to be installed in locations where no building power is available. Furthermore, the battery circuit 1020 can continue to power the smart vent 706 even when the PoE circuit 1016 and/or the power circuit 1018 are unavailable to power the smart vent 706. In some embodiments, the battery of the battery circuit 1020 is a nickel cadmium (Ni—Cd) battery and/or a nickel-metal hydride (Ni-MH) battery. In some embodiments, the battery is a lithium ion battery and/or a lithium polymer battery. In some embodiments, the battery circuit 1020 includes various power filters, rectifiers, converters, and/or transformers to power the smart vent 706 based on the power of the battery. The battery circuit 1020 can be configured to charge the battery when the power of the PoE circuit 1016 and/or of the power circuit 1018 is available (i.e., charge the battery of the battery circuit 1020 when PoE is available and/or when building power is available). In this regard, the battery circuit 1020 can include a battery that is charged and discharged based on the availability of external power.

The smart vent 706 includes a motor 1040. The motor 1040 can be configured to operate the louvers 800. The motor 1040 can be configured to operate open and/or close the louvers 800 between an open and a closed position. The motor 1040 can be a DC motor or an AC motor. The motor 1040 can be a brushless and/or brushed motor. In some embodiments, the motor 1040 is a stepper motor.

The memory 1008 can include a motor controller 1014. The motor controller 1014 can communicate with a vent controller 1010 included by the memory 1008. The vent controller 1010 can be configured to generate a control decision to open and/or close the louvers 800 (e.g., open or closed by a predefined amount). Based on the control decision by the vent controller 1010, the motor controller 1014 can operate the motor 1040 to cause the louvers 800 to be opened or closed by predefined amounts.

The memory 1008 is shown to include a peltier controller 1012. The peltier controller 1012 can be configured to operate a peltier circuit 1028 to cause one or multiple peltier modules of the smart vent 706 to heat and/or cool air of a duct (e.g., the duct 704) flowing into a zone. The smart vent 706 is shown to include a heating peltier module 1030 and a cooling peltier module 1032. In some embodiment, the heating peltier module 1030 and the cooling peltier module 1032 can be a solid-state active heat pump which transfers heat from one side of the module to the other side of the module, implementing either heating or cooling of the air flowing through the smart vent 706 based on the orientation of the module. The peltier circuit 1028 can be a circuit configured to receive a command to heat or cool the air from the peltier controller 1012 and apply an appropriate voltage to the heating peltier module 1030 and/or the cooling peltier module 1032 to cause air of the smart vent 706 to be heated or cooled.

In some embodiments, the smart vent 706 includes a resistive heating element. The smart vent 706 can be configured to cause current to flow through the resistive heating element to heat air flowing into the zone. The voltage level applied to the resistive heating element can be adjusted by the smart vent 706 to achieve a particular temperature setpoint in the zone.

In some embodiments, the smart vent 706 includes a single peltier module that is a reversible cartridge. The cartridge can be inserted by a homeowner into a receiver of the smart vent 706 and operated to heat or cool the air passing through the smart vent 706. The peltier module may be reversible so that based on the orientation of the module in the receiver, the peltier module can either heat or cool the air. Since a peltier is a heat pump, one side of the module becomes hot while another side of the module cools. In this regard, a first orientation of the module in the receiver may cause the hot side of the module to come in contact with the air while another orientation of the module may cause a cold side of the peltier module to come in contact with the air.

The smart vent 706 is shown to include an air quality sensor 1034. The air quality sensor 1034 can be configured to measure an air quality of air flowing through the smart vent 706 and/or within the zone of the smart vent 706. In some embodiments, the air quality sensor 1034 is configured to measure ozone, particulate matter, carbon monoxide, sulfur dioxide, nitrous oxide, carbon dioxide, allergen levels, volatile organic compounds, relative humidity, etc. The vent controller 1010 can be configured to receive air quality measurements for the air quality sensor 1034 and communicate the air quality measurements to the thermostat 400 via the communication interface 1002. In some embodiments, the vent controller 1010 can be configured to operate the louvers 800 of the smart vent 706 to improve the air quality of the zone which the smart vent 706 is located within based on the measurements of the air quality sensor 1034.

The smart vent 706 is shown to include a smoke detector 1022. The smoke detector 1022 can be the same as and/or similar to the smoke detector 916 as described with reference to FIG. 9. The smoke detector 1022 can be configured to determine whether a fire is present within a building that the smart vent 706 is located. The indication determined by the smoke detector 1022 can be communicated to the vent controller 1010. In response to a detection of a fire, the vent controller 1010 can be configured to operate to close the louvers 800 to restrict airflow to a zone of the smart vent 706 to prevent the spread of a fire within a building.

The smart vent is shown to include a microphone 1024. The microphone 1024 can be configured to sense audio of a zone. For example, if individuals are talking within a zone that the smart vent 706 is located, the vent controller 1010 can be configured to receive audio data recorded via the microphone 1024. Based on the audio data, the vent controller 1010 can be configured to determine a number of occupants within a zone (e.g., based on an audio command "I am home," "I'm here," etc.). For example, the vent controller 1010 can process the audio data to detect number of different voices in a period of time of the data and/or volume of the audio data to determine the number of the occupants. In some embodiments, the smart vent 706 includes a speaker configured to communicate operations to a user, e.g., "Command received, changing temperature to 75 degrees Fahrenheit" in response to a command recorded by the microphone 1024 "Change temperature to 75 degrees Fahrenheit." In some embodiments, the smart vent 706 can be integrated with, and/or communicate with (e.g., Wi-Fi, Bluetooth, etc.), a microphone/speaker system instead of, or in addition to, including a microphone itself. For example, the smart vent 706 can be integrated with an Alexa, Sonos, etc.

The vent controller 1010 can be configured to implement various models (e.g., neural networks, Bayesian networks, decision trees, support vector machines, etc.) to count the number of occupants within the zone. Based on the number of occupants within the zone, the vent controller 1010 can be configured to control the louvers 800 to heat or cool the zone. For example, if a large number of individuals are present in the zone (e.g., there are more than a predefined number of occupants), a temperature setpoint can be lowered since the large number of occupants significantly heats the zone.

The smart vent 706 is shown to include a filter 922. The filter 922 can filter air flowing through the smart vent 706 into a zone. For example, air circulated through the duct 704 into one of the zones 1-5 can first be filtered by the smart vent 706. The filter can improve the air quality within the zone by removing particles, chemicals, etc. The air filter 922 can be a fiberglass filter, a polyester and pleated filter, a high efficiency particulate air (HEPA) filter, and/or any other type of filter. In some embodiments, the filter 922 can be replaceable and can be replaced by a user once the filter becomes old or is no longer operating properly to filter air. The smart vent 706 can include a mechanical apparatus for receiving and holding the filter 922. The apparatus can be configured to allow a user to remove and/or replace the filter 922.

The smart vent 706 includes an airflow sensor 1038. The airflow sensor 1038 can measure airflow through the smart vent 706. The vent controller 1010 can receive the airflow measurements of the airflow sensor 1038. In some embodiments, the vent controller 1010 is configured to determine, based on the airflow measurements, whether the filter 922 needs to be replaced. For example, based on historical measurements of the airflow sensor 1038, the vent controller 1010 can determine whether the airflow values are trending down and/or are lower than a predefined amount (e.g., when the indoor fan 638 is running at a particular speed). Based on the trend, the vent controller 1010 can determine whether the air filter 922 needs to be replaced.

Similarly, the smart vent 706 can determine whether the air filter of the indoor unit 504 needs to be replaced. In some embodiments, the vent controller 1010 can analyze the time at which the filter 922 is replaced, the time at which the filter of the indoor unit 504 is replaced, and/or historical airflow data of the airflow sensor 1038 to determine when the air filter 922 and/or the air filter of the indoor unit 504 needs to be replaced. Furthermore, air quality measurements of the air quality sensor 1034 can be analyzed by the vent controller 1010 to determine whether the filter 922 or the filter of the indoor unit 504 needs to be replaced.

The smart vent 706 is shown to include a temperature sensor 1036. Based on temperature sensed by the temperature sensors 1036, the smart vent 706 can be configured to determine whether to open or close the louvers 800. The temperature sensor 1036 can provide the smart vent 706 with an indication of the temperature of a zone. In this regard, the smart vent 706 can determine whether to open or close the louvers 800 based on the sensed temperature and based on a temperature setpoint. The vent controller 1010 can be configured to implement various control algorithms, e.g., proportional integral derivative (PID) control, to cause the zone temperature sensed by the temperature sensor 1036 to reach the temperature setpoint. Furthermore, based on the measured temperature, the vent controller 1010 can cause the peltier controller 1012 to cause the heating peltier module 1030 and/or the cooling peltier module 1032 to cause the zone temperature to be the setpoint temperature.

Figure 11:
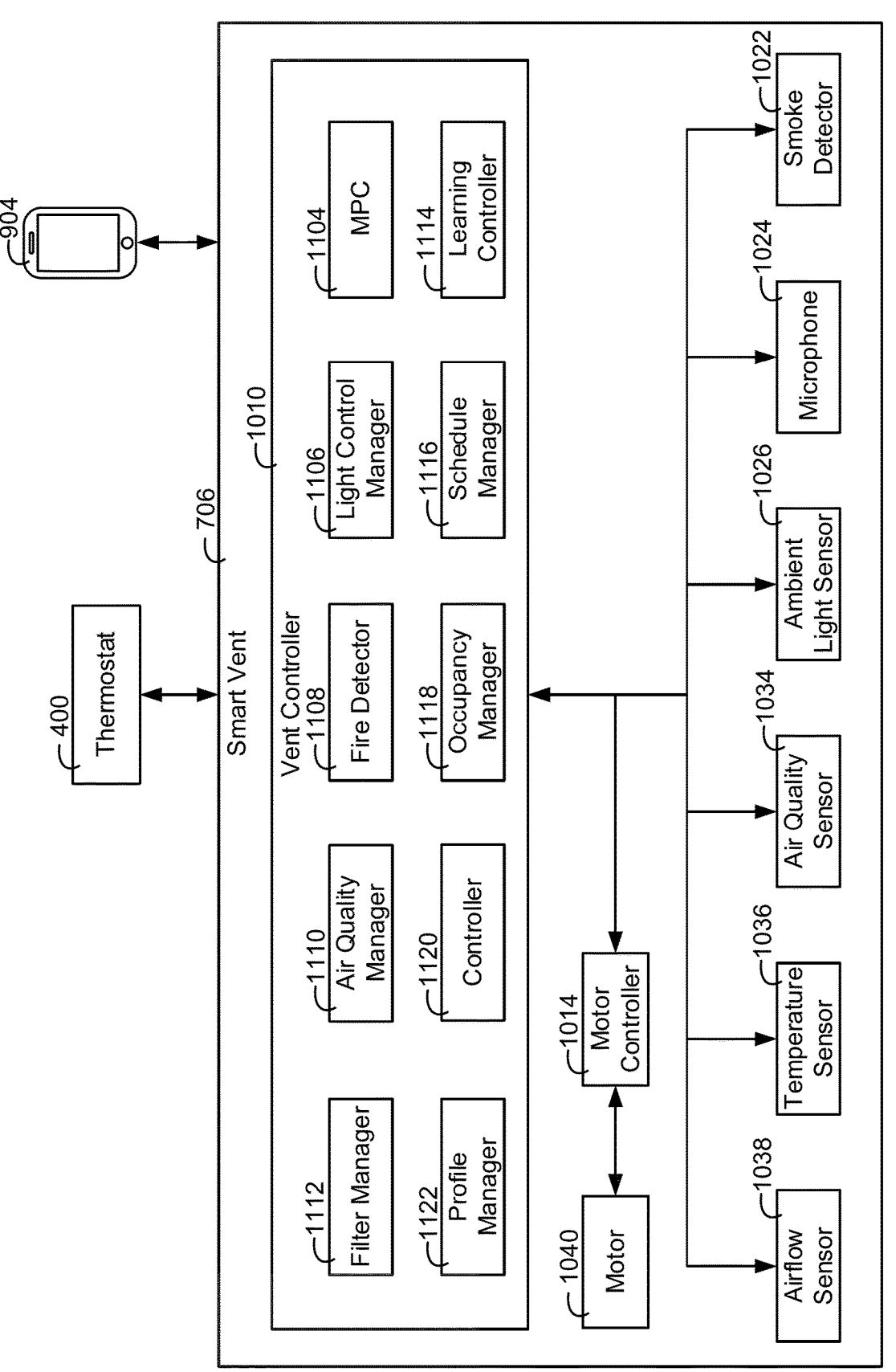
FIG. 11 is a block diagram of a thermostat of the smart vent system of FIG. 7 and one of the vents of FIG. 7 where the vent includes local control logic, according to an exemplary embodiment.

Referring now to FIG. 11, the smart vent 706 is shown in greater detail including the vent controller 1010 configured to operate the smart vent 706, according to an exemplary embodiment. The smart vent 706 is shown to communicate with the thermostat 400. The smart vent 706 and the thermostat 400 can be configured to communicate via the network 902 as described with reference to FIG. 9. In some embodiments, the thermostat 400 is configured to send operating settings to the smart vent 706. Based on the operating settings the smart vent 706 can be configured to operate louvers to allow heated or cooled air to enter a zone or be permitted from entering the zone.

Furthermore, the smart vent 706 can communicate with the user device 904. In some embodiments, the smart vent 706 communicates with the user device 904 via the network 902. Furthermore, the user device 904 can be configured to provide settings to the smart vent 706 that the smart vent 706 can be configured to operate with. For example, either the thermostat 400 and/or the user device 904 can provide an operating profile, a setpoint (e.g., temperature, humidity, air quality), a louver position level (e.g., 40% open, 10% closed), etc. Based on the received setting, the smart vent 706 can be configured to operate to achieve the required setting.

The vent controller 1010 includes multiple components, each configured to provide control or analysis for the smart vent 706. The vent controller 1010 includes a filter manager 1112. The filter manager 1112 can be configured to receive airflow data from the airflow sensor 1038 and/or air quality data from the air quality sensor 1034. Based on the data and/or based on historical collections of the data collected over time, the filter manager 1112 can be configured to identify whether a filter of the smart vent 706 and/or another filter of an HVAC system, e.g., a filter of the indoor unit 504, needs to be replaced.

The vent controller 1010 includes an air quality manager 1110. The air quality manager 1110 can be configured to receive air quality data from the air quality sensor 1034. Based on the air quality data, the air quality manager 1110 can be configured to cause the smart vent 706 to improve the air quality of a zone that the smart vent 706 is located within. For example, if the air quality manager 1110 determines that the air quality sensed by the air quality sensor 1034 is poor, the air quality manager 1110 can be configured to open louvers of the smart vent 706. In some embodiments, the air quality manager 1110 can be configured to receive outdoor air quality data. In some embodiments, the air quality manager 1110 can be configured to open the louvers only if the outdoor air quality measured by the air quality sensor 1034 is better than indoor air quality, e.g., the outdoor air quality levels are higher than the indoor air quality levels.

The vent controller 1010 can perform both comfort and safety operations. The vent controller 1010 can act as a safety backup to the thermostat 400. For example, the vent controller 1010 can locally determine the presence of fire, whether zone temperatures have risen or fallen to dangerous levels, when CO2 levels have risen to dangerous levels, etc. For example, if the temperature is to hot or too cold, the vent may close its louvers. Furthermore, if CO2 levels rise to a predefined level, all vents may open their louvers. In some embodiments, the logic implementing the safety operations is implemented in the thermostat 400 but also redundantly in the vents so that the vents can perform safety operations even in the event that the thermostat 400 fails or loses communication with the vents. The vent controller 1010 includes a fire detector 1108.

The fire detector 1108 can be configured to receive smoke detector data and/or an indication of a fire from the smoke detector 1022. In some embodiments, the smoke detector 1022 is outside the smart vent 706 and communicates information to the smart vent 706 via a network (e.g., the smoke detector 916 communicates with the smart vent 706 via the network 902). The fire detector 1108 can, based on the indication of a fire, and/or based on analysis of the smoke detector data of the smoke detector 1022, determine that a fire is present within a building. In response to a detection of the fire, the fire detector 1108 can be configured to operate louvers of the smart vent 706 to reduce airflow in a zone. This prevents the fire from spreading and prevents air circulation from causing the fire to grow.

The vent controller 1010 includes a light control manager 1106. The light control manager 1106 can receive ambient light data from the ambient light sensor 1026. Based on the ambient light data and/or based on a current operation of the smart vent 706 (e.g., heating or cooling a zone) the light control manager 1106 can be configured to determine whether to cause the shade control system 918 to open or close the shades. In some embodiments, if the smart vent 706 is operating to heat the zone to a temperature setpoint, if light intensity is above a predefined amount in the zone (high sunlight), the light control manager 1106 can cause the shade control system 918 to open shades to allow for natural heating of the zone. Similarly, if the smart vent 706 is operating to cool the zone and the light intensity is above a predefined amount (high sunlight in the zone), the light control manager 1106 can operate to cause the shade control system 918 to close shades of the zone.

The vent controller 1010 includes a model predictive controller (MPC) 1104. The MPC 1104 can be configured to perform an optimization over a further time window of discrete intervals to determine operating settings for the smart vent 706 at each of the windows by optimizing an objective function with one or multiple constraints. The MPC 1104 can take into account parameters such as outside temperature, thermostat setpoint, time of day, etc. In some embodiments, the objective function indicates cost of operating the smart vent 706, occupant comfort, occupant health, or another parameter. The constraints may indicate one or multiple physical constraints of the smart vent 706 (e.g., the louvers can move between a fully open position and a fully closed position), temperature cannot exceed a particular level or fall below a particular level, etc. Based on the objective function and the constraints, the MPC 1104 can be configured to generate operating parameters by performing an optimization, e.g., a Linear Programming Optimization.

The vent controller 1010 includes a profile manager 1122. The profile manager 1122 can store multiple different operating profiles which can define sets of parameters (e.g., setpoints) or objectives and/or constraints. For example, the profile manager 1122 can include a baby room profile which may have particular setpoints and/or humidity levels to be appropriate for a baby. For example, a baby may be required to be warm, as such, the temperature and/or humidity levels of the room may be higher. Furthermore, babies may be sensitive to allergens. For this reason, air quality constraints and/or settings can be implemented, the constraints and/or settings requiring high air quality values of the room. In some embodiments, the profile may be an allergic individual and may include settings for high air quality values for the room.

The profiles may include a guest profile. A user may define the guest profile via the user device 904 and/or the thermostat 400. The guest profile may allow for a guest to implement settings which they prefer. In some embodiments, the profiles are user profiles, e.g., defined by a name or nickname of a user and including that the settings preferred by that user. A selection of a profile can be made by the thermostat 400 and/or via the user device 904. Based on the selection, the profile manager 1122 can implement operating settings of the vent controller 1010 to achieve the parameters of the selected operating profile. In some embodiments, the guest profile may indicate to only vent a zone at an infrequent period and/or only when the zone is occupied. This may realize energy savings since a guest room may be occupied infrequently. In some embodiments, the thermostat 400 and/or the smart vent 704 receives an indication whether a door of a guest room, the zone where the smart vent 704 is located, and only vents the guest room when in the guest room profile when the door is opened and/or was opened within a predefined previous time period.

The vent controller 1010 is shown to include controller 1120. The controller 1120 can be configured to implement various control algorithms to implement a setting received from the thermostat 400 and/or the user device 904. Furthermore, the setting may be a setting of a selected operating profile. The controller 1120 can generate control decisions (e.g., to open or close a vent by a predefined amount, to turn on or off a peltier module, etc.). The controller 1120 can be a variety of control algorithms (e.g., state-based algorithms, extremum-seeking control algorithms, PID control algorithms, model predictive control algorithms, feedback control algorithms, etc.) to determine appropriate control actions for the smart vent 706.

The smart vent controller 1010 includes an occupancy manager 1118. The occupancy manager can receive audio data from the microphone 1024. Based on the audio data, the occupancy manager 1118 can be configured to determine whether an occupant and/or what number of occupants are within a zone controlled by the smart vent 706. Furthermore, the smart vent 706 can perform gas based occupancy calculations to perform the control of the zone. The occupancy manager 1118 can measure human generated gases via the air quality sensor 1034 and determine control actions for the components of the zone. Examples of gas based occupancy determination and control can be found in U.S. patent application Ser. No. 15/953,012 filed Apr. 13, 2018, the entirety of which is incorporated by reference herein. The occupancy manager 1118 can receive occupancy data from other occupancy sensors of the smart vent 706 (e.g., passive infrared (PIR) sensors) or from a remote sensor.

The smart vent controller 1010 includes a schedule manager 1116. The schedule manager 1116 can be configured to implement various operating schedules (e.g., heating and cooling schedules, vacation schedules, television program schedules, etc.) that indicate whether an occupant will be present or not present in a particular zone or area of a building. The schedule manager 1116 can be configured to override the schedule in response to detecting occupancy in a zone of the smart vent 706. The schedule manager 1116 can be configured to receive indications of schedules from schedule servers e.g., a GOOGLE calendar server. Furthermore, the schedule manager 1116 can receive an indication of a television interest of a user (e.g., receive from the thermostat 400 and/or the user device 904). The television interest may be a sport, a sports team, a particular television series, a newscast, etc.

The schedule manager 1116 can be configured to retrieve television program schedules that indicate when a program is on (e.g., when a particular show airs, when a particular sport is on television, when a particular sports team plays, when a nightly newscast runs, etc.) from a television program server. Based on the retrieved television schedule information, the schedule manager 1116 can determine times at which the zone is likely to be occupied, i.e., at times when the program is on air. The schedule manager 1116 can be configured to heat or cool the zone prior to the zone being occupied so that the temperature of the zone is at a user preferred setting when the user enters the zone.

The vent controller 1010 is shown to include a learning controller 1114. The learning controller 1114 can be configured to generate occupancy pattern data based on occupancy determinations and/or occupancy schedules. The learning controller 1114 can be configured to generate various predictive models, e.g., neural networks and/or Bayesian networks, that indicate a probability of the zone being occupied, the models being trained on historical data and the input of the model being a current time and/or day. If a probability of occupancy is above a predefined level for a probable occupant level, the smart vent 706 can be configured to cool or heat the zone at and/or prior to the predicted time. In some embodiments, the learning controller 1114 can generate tables and/or matrices indicating temperatures of various zones, times of day, dates, and/or control operations and utilize the tables and/or matrices in learning proper control settings. In some embodiments, the smart vent 706 may implement timer-based control which the learning controller 1114 can be configured to adjust to include improved parameters.

Figure 12:
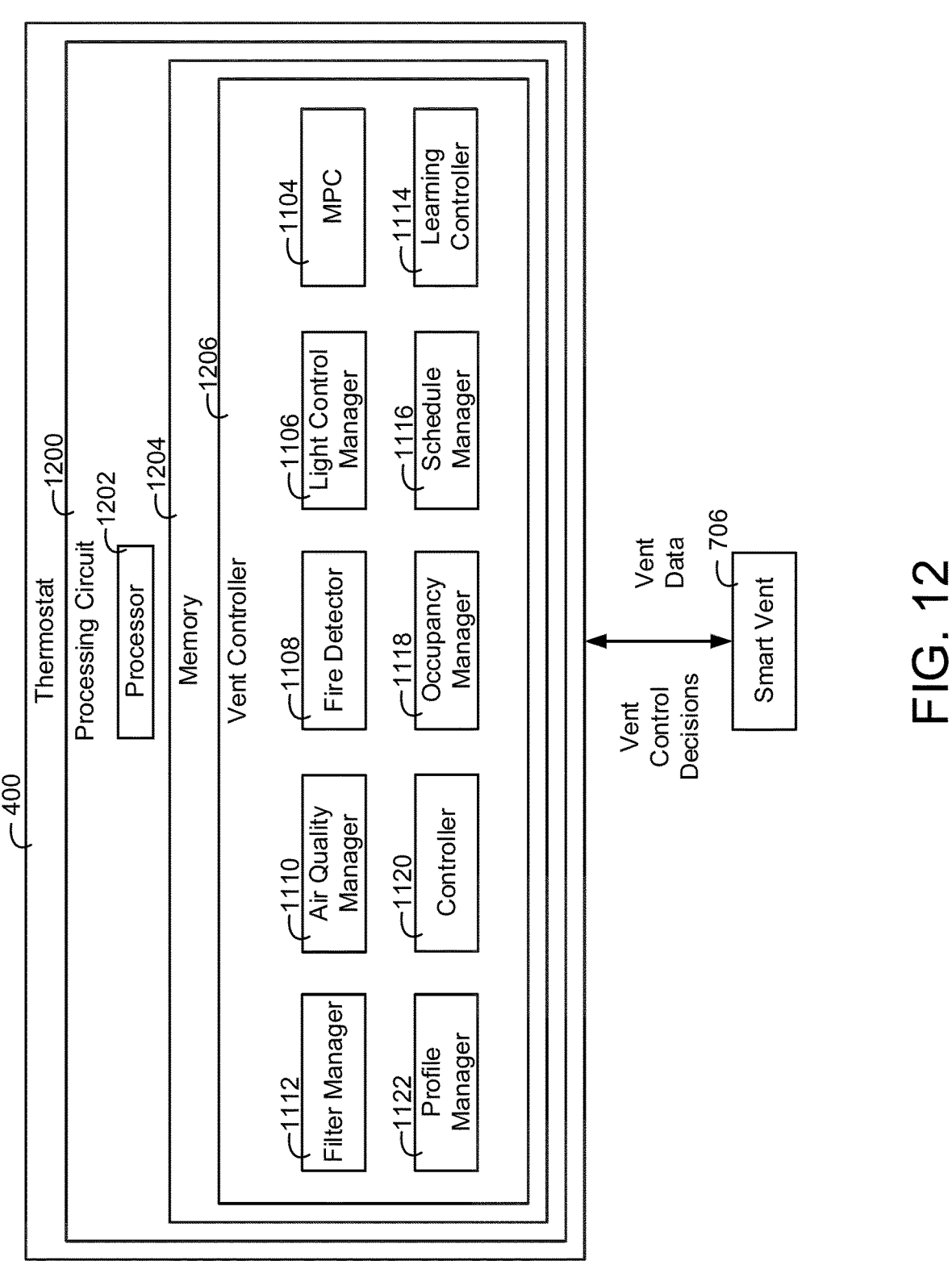
FIG. 12 is a block diagram of the thermostat of the smart vent system of FIG. 7 and one of the vents of FIG. 7 where the thermostat includes control logic for controlling the vent, according to an exemplary embodiment.

Referring now to FIG. 12, the thermostat 400 and the smart vent 706 of FIG. 9 are shown in greater detail performing thermostat based control, according to an exemplary embodiment. In FIG. 12, the thermostat 400 includes a processing circuit 1200. The processing circuit 1200 is shown to include a processor 1202 and memory 1204. The processor 1202 can be a general purpose or specific purpose processor, an application specific integrated circuit (ASIC), one or more field programmable gate arrays (FPGAs), a group of processing components, or other suitable processing components. The processor 1202 can be configured to execute computer code and/or instructions stored in the memory 1204 or received from other computer readable media (e.g., CDROM, network storage, a remote server, etc.).

The memory 1204 can include one or more devices (e.g., memory units, memory devices, storage devices, etc.) for storing data and/or computer code for completing and/or facilitating the various processes described in the present disclosure. The memory 1204 can include random access memory (RAM), read-only memory (ROM), hard drive storage, temporary storage, non-volatile memory, flash memory, optical memory, or any other suitable memory for storing software objects and/or computer instructions. The memory 1204 can include database components, object code components, script components, or any other type of information structure for supporting the various activities and information structures described in the present disclosure. The memory 1204 can be communicably connected to the processor 1202 via the processing circuit 1200 and can include computer code for executing (e.g., by the processor 1202) one or more processes described herein.

The memory 1204 is shown to include the vent controller 1206 and the components of the vent controller 1206 as described with reference to FIG. 11. In this regard, the thermostat 400 can perform the control and analysis of the smart vent 706. The smart vent 706 is shown to provide vent data collected by the sensors of the smart vent 706 to the thermostat 400. The data can be communicated via a network, e.g., the network 902. Based on the data, the thermostat 400 can generate control decisions for operating the smart vent 706 (e.g., open or close louvers of the smart vent 706, turn on or off a peltier module, etc.). The smart vent 706 can receive the control decisions which can be communicated via the network 902 and operate based on the control decisions.

Figure 13:
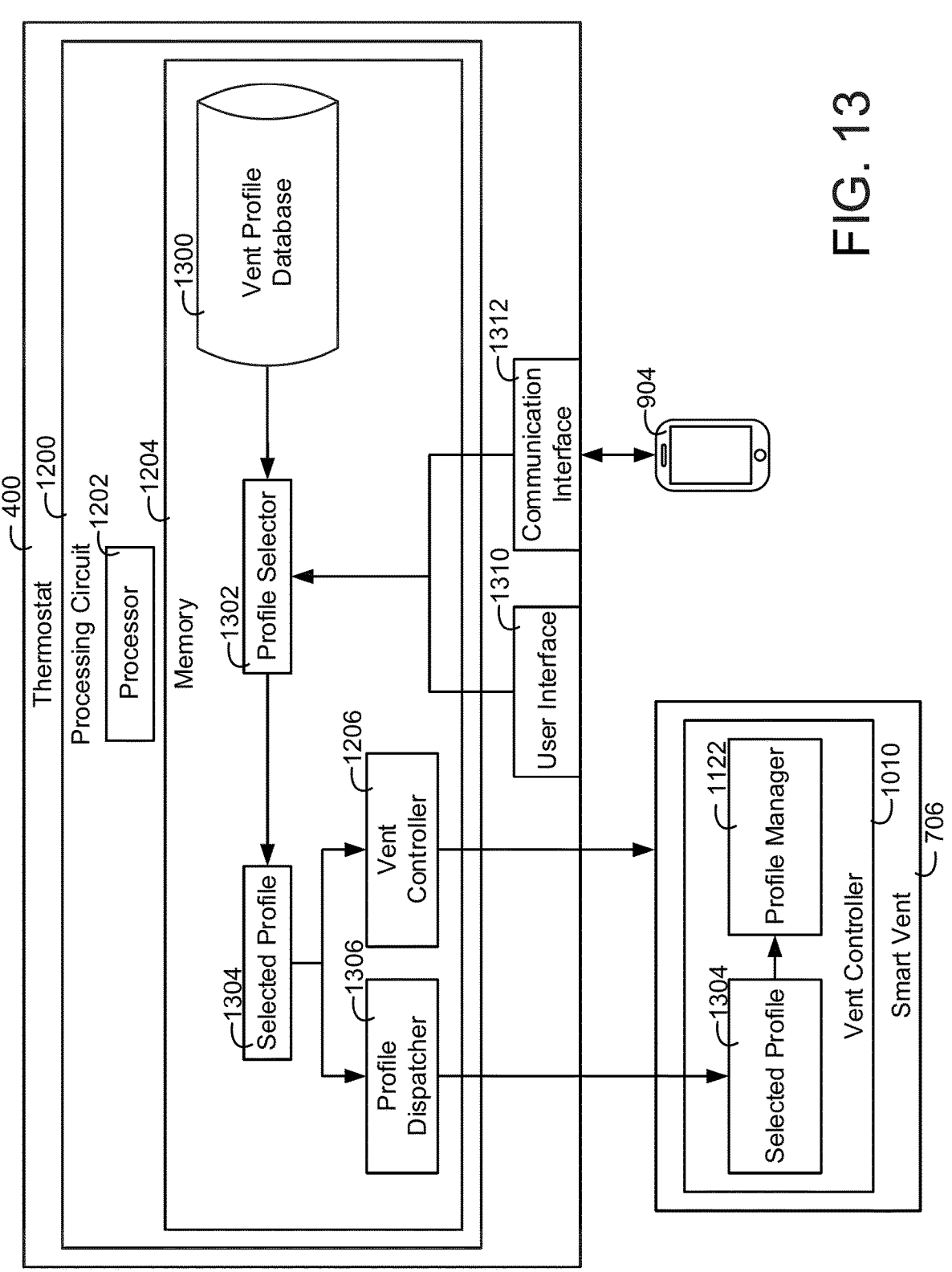
FIG. 13 is a block diagram of the thermostat of the smart vent system of FIG. 7 including vent profile logic for controlling the vents of the smart vent system of FIG. 7, according to an exemplary embodiment.

Referring now to FIG. 13, the thermostat 400 configured to perform profile based control of a zone via the smart vent 706 is shown, according to an exemplary embodiment. The memory 1204 is shown to include a vent profile database 1300. The vent profile database 1300 can include the various profiles, e.g., baby profile, allergic profile, guest profile, user profile, etc. as described with reference to FIG. 11. Memory 1204 is shown to include a profile selector 1302. The profile selector 1302 can select one of the vent profile database 1300. The profile selector 1302 can receive user input from a user interface 1310 and/or via a user device 904. The profile selector 1302 can provide a selected profile 1304 to a profile dispatcher 1306 and/or a vent controller 1206.

The vent controller 1206 can be configured to operate the smart vent 706 based on the selected profile 1304 (e.g., as shown in FIG. 12). The profile dispatcher 1306 can transmit the profile to the smart vent 703. The profile manager 1122 can be configured to control the smart vent 706 based on the selected profile 1304 (e.g., as shown in FIG. 11).

The thermostat 400 is shown to include the user interface 1310. The user interface 1310 can be configured to display graphic interfaces to a user, e.g., the interface as described with reference to FIG. 21. In some embodiments, user interface 1310 is one or a combination of a CRT display, an LCD display, an LED display, a plasma display, and/or an OLED display. The selection of the profile can be received via the user interface 1310. Furthermore, the thermostat 400 is shown to include a communication interface 1312. The communication interface 1312 can include one or multiple receivers, transceivers, transmitters, and/or physical interfaces for connection and communicating with the user device 1102. The thermostat 400 can receive the selection of the profile via the communication interface 1312 from the user device 1102. The user device 1102 can display a selection user interface to a user for operating the smart vent 706, e.g., the interface as described with reference to FIG. 21.

Referring now to FIG. 14, a process 1400 for performing profile based control and operating of a smart vent is shown, according to an exemplary embodiment. Steps of the process 1400 can be performed locally on a smart vent or by a controller device (e.g., a thermostat). One, multiple, or all of the smart vents 906-910, the smart vent 708, and the smart vent 706 can be configured to perform some or all of the steps of the process 1400. Furthermore, the thermostat 400 can be configured to perform some and/or all of the process 1400. The user device 904 can be configured to perform some or all of the process 1400. In some embodiments, some or all of the process 1400 is performed remotely, i.e., it is performed on a server. Furthermore, any computing device as described herein can be configured to perform the process 1400.

In step 1402, a first device receives a selection of an operating profile for a vent of a zone of a building. For example, the thermostat 400 and/or the user device 904 can receive the selection of the profile for the smart vent 706 to control environmental conditions of the zone 2. In some embodiments, a user interface is presented to a user display-ing all possible operating profiles for the zone, e.g., a baby room profile, a visitor profile, an allergy profile, etc., each of the profiles being associated with particular settings and/or overall operational goals (e.g., constraints or goals for machine learning or optimization). For example, if the profile based control of the process 1400 is based on machine learning, a goal of the machine learning could be to lower air pollution levels for the allergy profile.

The machine learning could operate the smart vent 706 to learn what control decisions to make in various environ-mental conditions to achieve low air pollution or allergen levels. In some embodiments, user interface for selecting the operating profile can be, or can be similar to, the user interface as described with reference to FIG. 21. In some embodiments, the machine learning on and/or for the smart vent could be reward based cognitive agents as described with reference to U.S. patent application Ser. No. 15/586, 104, filed May 3, 2017, the entirety of which is incorporated by reference herein.

Steps 1404 and 1406 may be optional steps pertaining to some embodiments where a thermostat performs the gen-eration of control operations for a smart vent. In some embodiments, the smart vent itself generates the control operations. In the step 1404, a thermostat can generate one or more control decisions for the vent based on the selected operating profile. In some embodiments, the thermostat 400 receives indications of zone temperature, humidity, air qual-ity levels, etc. from the smart vent 706 and/or a zone sensor. Based on the selected operating profile and the environmen-tal conditions of the zone, the thermostat 400 can generate control decisions, e.g., turn on or off heating devices or cooling devices of the smart vent 706, open or close louvers of the smart vent 706 to allow or restrict heated or cooled air from entering the zone 5, etc.

In the step 1406, the thermostat operates a heating peltier module, a cooling peltier module, and/or a vent motor (e.g., a motor that opens or closes louvers) of the smart vent 706 by communicating the control decisions determined in the step 1404 to the smart vent 706. In some embodiments, the thermostat 400 communicates the control decisions to the smart vent 706 via the network 902. The smart vent 706 can receive the control decisions and operate the motor 1040, the heating peltier module 1030, and/or the cooling peltier module 1032 to control the environmental conditions of the zone 1.

In step 1408, the thermostat can communicate the selected operating profile of the step 1402 to the vent via a network. In some embodiments, the thermostat 400 transmits the operating profile itself (e.g., the settings and/or machine learning goals) to the smart vent 706. In some embodiments, the smart vent 706 stores all operating profiles and the thermostat 400 transmits an indication of a stored profile to operate with. The communication of the operating profile and/or indication of the operating profile can be performed via the network 902. In step 1410, the vent determines one or more control decisions for the vent based on the selected operating profile communicated to the vent in the step 1408. In step 1412, the vent can operate a heating peltier module, a cooling peltier module, and/or a vent motor based on the one or more control decisions determined in the step 1410. The step 1410 and 1412 can be the same and/or similar to the steps 1404 and 1406 but instead of being performed on the thermostat 400, are performed on the smart vent 706.

Referring now to FIG. 15, a process 1500 for improving the air quality of a zone of a building with a thermostat and a smart vent is shown, according to an exemplary embodi-ment. Steps of the process 1500 can be performed locally on a smart vent or by a controller device (e.g., a thermostat). One, multiple, or all of the smart vents 906-910, the smart vent 708, and the smart vent 706 can be configured to perform some or all of the steps of the process 1500. Furthermore, the thermostat 400 can be configured to per-form some and/or all of the process 1500. The user device 904 can be configured to perform some or all of the steps of the process 1500. In some embodiments, some or all of the steps of the process 1500 is performed remotely, i.e., it is performed on a server. Furthermore, any computing device as described herein can be configured to perform the process 1500.

In step 1502, a thermostat receives indoor air quality data from a vent. The indoor air quality data may be indicative of the air quality within the zone 2 and may be data collected by the smart vent 706 via the air quality sensor 1034. In some embodiments, a remote sensor is located within the zone 5, e.g., the zone sensor 912 and the zone sensor 9812 collects the air quality data and communicates the air quality data to the thermostat 400 via the network 902. In the event that the thermostat 400 is located in the same zone as the smart vent 706, the thermostat 400 may itself include an air quality sensor and can be configured to measure indoor air quality of the zone 2 itself.

In the 1504, the thermostat can determine whether the indoor air quality data indicates poor air quality data. For example, the thermostat 400 can determine the air quality level indicated by the air quality data is lower than a predefined amount. In some embodiments, the thermostat 400 can determine whether an indoor pollen count is greater than a predefined amount, indicating that the indoor air quality is bad. A determination that the indoor air quality is bad may indicate that corrective actions should be per-formed by the thermostat 400 and/or the smart vent 706 to improve the air quality.

In step 1506, the thermostat can receive outdoor air quality data. The outdoor air quality data may be indicative of the air quality of a neighborhood or city where the thermostat 400 is located. The thermostat 400 can receive the outdoor air quality data (e.g., pollen counts, temperature, humidity) from an outdoor sensor and/or from a weather and/or air quality server. In step 1508, the thermostat can determine whether the outdoor air quality data indicates good outdoor air quality data. For example, the thermostat 400 can determine whether the outdoor air quality data is greater than a predefined amount. In some embodiments, the thermostat 400 can determine whether an outdoor air pollen count is lower than a predefined amount, indicating good outdoor air quality.

In step 1510, the thermostat can cause the vent to operate a vent motor to open louvers of the vent in response to a determination that the indoor air quality data indicates poor air quality and a determination that the outdoor air quality data indicates good air quality. The determinations that the indoor air quality is bad and the outdoor air quality is good may indicate that circulation of outdoor air into the zone 2 will improve the air quality of the zone 2. In this regard, opening the louvers of the smart vent 706 may allow for the circulation of fresh air into the zone 2.

In step 1512, the thermostat can cause a supply fan to operate to circulate air through the vent in response to the determination that the indoor air quality data indicates poor air quality and a determination that the outdoor air quality data indicates good air quality. Running a supply fan may cause air from outside of a building to be circulated through the building, in particular, through the duct 704 through the smart vent 706 (the smart vent 706 having louvers in the open position), and into the zone 5. Examples of air quality based control by a thermostat is described in U.S. patent application Ser. No. 15/953,166 filed Apr. 13, 2018, the entirety of which is incorporated by reference herein. Furthermore, the thermostat 400 can also run an exhaust fan in response to the determinations, e.g., the exhaust fan 710.

Referring now to FIG. 16, a process 1600 of operating shades of a zone based on light detections of a smart vent to heat or cool the zone is shown, according to an exemplary embodiment. Steps of the process 1600 can be performed locally on a smart vent or by a controller device (e.g., a thermostat). One, multiple, or all of the smart vents 906-910, the smart vent 708, and the smart vent 706 can be configured to perform some or all of the steps of the process 1600. Furthermore, the thermostat 400 can be configured to perform some and/or all of the process 1600. The user device 904 can be configured to perform some or all of the steps of the process 1600. In some embodiments, some or all of the steps of the process 1500 is performed remotely, i.e., it is performed on a server. Furthermore, any computing device as described herein can be configured to perform the process 1600.

In step 1602, a device can receive ambient light data from an ambient light sensor of a zone. In some embodiments, the device is the smart vent 706 or the thermostat 400. In some embodiments, the device is a remote sensor, e.g., the zone sensor 912. In some embodiments, the remote sensor is a light switch of a zone, the light switch including a light intensity sensor. Either the smart vent 706 and/or the zone sensor 912 can, in some embodiments, communicate the light data to the thermostat 400.

In step 1604, the device can determine whether the ambient light data is indicative of sun shining through a window of a zone. In some embodiments, the thermostat 400 and/or the smart vent 706 can determine, based on the ambient light data, whether or not the sun is shining by through the window. In some embodiments, the thermostat 400 and/or the smart vent 706 receives an indication of lighting system status to determine whether the sun is shining while also taking into account artificial light generated by the lighting system.

In step 1606, the device can operate one or more window shade systems to block or allow the sunlight to shine through the window. In some embodiments, the thermostat 400 and/or the smart vent 706 can operate the shade control system 918. In some embodiments, the thermostat 400 and/or the smart vent 706 is configured to determine whether the smart vent 706 is attempting to heat or cool the zone 2. If the smart vent 706 is attempting to heat the zone and there is sunlight, the thermostat 400 and/or the smart vent 706 can operate the shade control system 918 to open the shades. If the smart vent 706 is attempting to cool the zone 2, the thermostat 400 and/or the smart vent 706 can close the shades if sunlight intensity greater than a predefined amount is detected.

Figure 17:
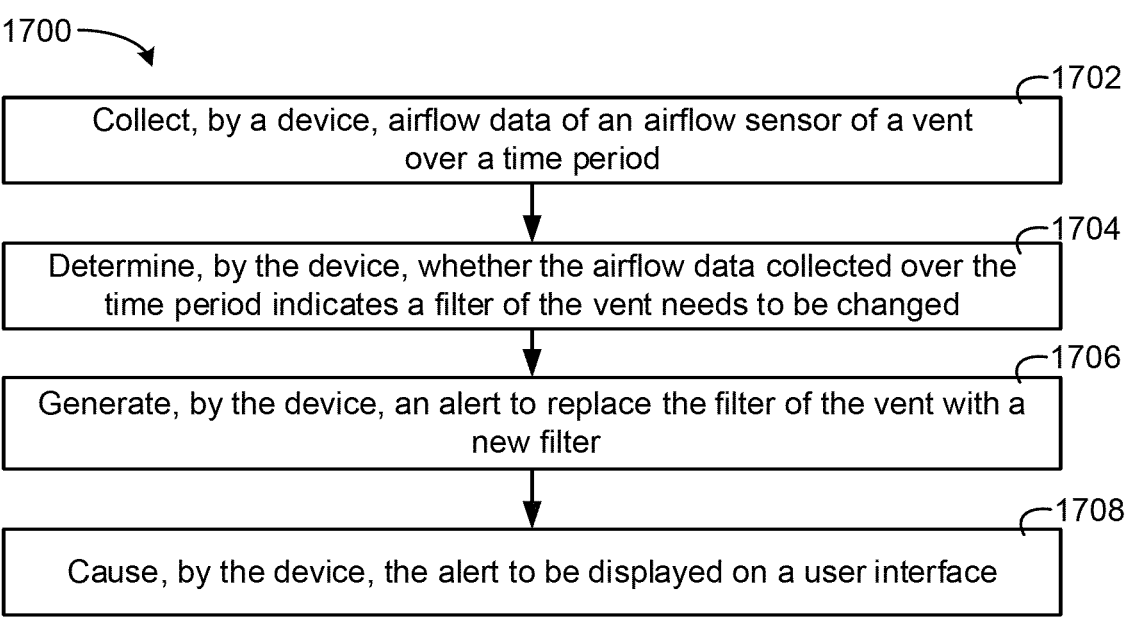
FIG. 17 is a flow diagram of a process for determining whether an air filter needs to be replaced based on air quality data of an air quality sensor of a smart ventilator of the smart vent system of FIG. 7, according to an exemplary embodiment.

Referring now to FIG. 17, a process 1700 of determining whether an air filter of a smart vent needs to be replaced is shown, according to an exemplary embodiment. Steps of the process 1700 can be performed locally on a smart vent or by a controller device (e.g., a thermostat). One, multiple, or all of the smart vents 906-910, the smart vent 708, and the smart vent 706 can be configured to perform some or all of the steps of the process 1700. Furthermore, the thermostat 400 can be configured to perform some and/or all of the process 1700. The user device 904 can be configured to perform some or all of the steps of the process 1700. In some embodiments, some or all of the steps of the process 1700 is performed remotely, i.e., it is performed on a server. Furthermore, any computing device as described herein can be configured to perform the process 1700.

In step 1702, a device can collect airflow data from an airflow sensor of a vent over a time period. In some embodiments, the thermostat 400 and/or the smart vent 706 collects the airflow data from the airflow sensor 1038. In some embodiments, the smart vent 706 collects and communicates the airflow data to the thermostat 400 via the network 902. In step 1704, the device determines whether the airflow data collected over the time period indicates that a filter of the vent needs to be changed. In some embodiments, the thermostat 400 and/or the smart vent 706 performs an analysis of the collected airflow data of the step 1702 to determine whether the filter 922 of the smart vent 706 needs to be replaced. In some embodiments, the analysis is a statistical analysis and/or a machine learning model, e.g., a neural network.

In some embodiments, the thermostat 400 and/or the smart vent 706 compare indoor air quality levels and outdoor air quality levels to determine whether the filter 922 needs to be replaced (or whether a furnace filter needs to be replaced). For example, an outside pollen count can be compared to an indoor pollen count. In some embodiments, the thermostat 400 and/or smart vent 706 can analyze airflow data and/or air quality data (indoor air quality data and/or outdoor air quality data) to determine whether a duct needs cleaning. In response to determining that a duct needs cleaning or service and/or a filter needs replacement, the thermostat 400 and/or the smart vent 706 can communicate with a maintenance server to schedule a technician visit to the building.

In step 1706, the device generates an alert to replace the filter of the vent with a new filter. In some embodiments, the thermostat 400 and/or the smart vent 706 generates the alert in response to the determination in the step 1704 that the filter 922 requires replacement. In some embodiments, the alarm is an indication included on a display screen of the thermostat 400. In some embodiments, the alarm is pushed to a user device, e.g., the user device 904, step 1708.

Figure 18:
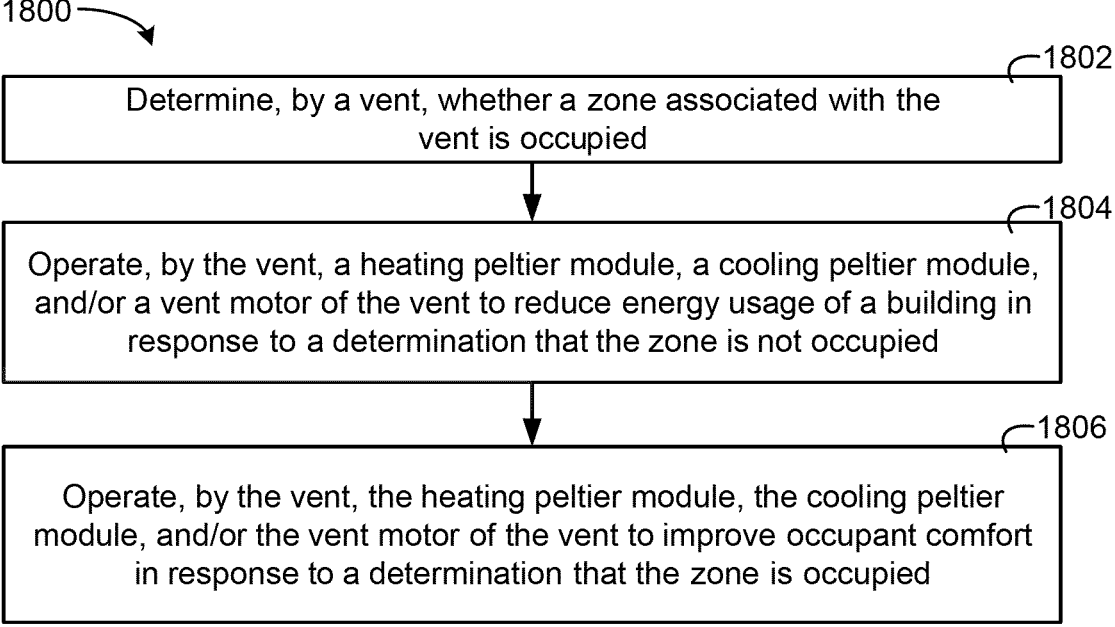
FIG. 18 is a flow diagram of a process for performing local heating or cooling with a peltier module of a smart vent of the smart vent system of FIG. 7, according to an exemplary embodiment.

Referring now to FIG. 18, a process 1800 of determining whether a zone associated with a vent is occupied is shown, according to an exemplary embodiment. Steps of the process 1800 can be performed locally on a smart vent or by a controller device (e.g., a thermostat). One, multiple, or all of the smart vents 906-910, the smart vent 708, and the smart vent 706 can be configured to perform some or all of the steps of the process 1800. Furthermore, the thermostat 400 can be configured to perform some and/or all of the process 1800. The user device 904 can be configured to perform some or all of the steps of the process 1800. In some embodiments, some or all of the steps of the process 1800 is performed remotely, i.e., it is performed on a server. Furthermore, any computing device as described herein can be configured to perform the process 1800.

In step 1802, a vent determines whether a zone associated with the vent is occupied. In some embodiments, the smart vent 706 determines, based on occupancy data gathered from occupancy sensors, whether the zone 5 is occupied by one or multiple occupants. In some embodiments, the smart vent 706 determines whether the zone 5 is occupied based on audio data collected from the microphone 1024, human generated gas measurements of the air quality sensor 1034, a schedule defined by a user, a vacation schedule, a television interest of a user, etc. In some embodiments, the determination is a predicted determination for a future time so that precooling or preheating of the zone 2 can be performed by the smart vent 706 before the zone 2 is occupied so that the zone 2 is at a desired temperature at the time when the zone 2 is occupied. In some embodiments, the thermostat 400 and/or the smart vent 706 receives an indication of a location of a mobile phone and performs geofencing to determine whether the mobile phone is occupying a zone associated with the smart vent 706 and/or a building associated with the smart vent 706. In some embodiments, the thermostat 400 and/or the smart vent 706 can receive schedules for multiple users and can refer to a priority list to determine which schedules to utilize if two schedules have coinciding events.

In some embodiments, multiple geofences can be implemented. For example, a geofence can exist for each zone of a building and also a geofence for the entire building. In this regard, different levels of operation can be implemented by the smart vent 706 based on whether a user is within a zone of the smart vent 706 and/or within the building.

In step 1804, the vent can operate to reduce energy usage of a building by operating a heating peltier module, a cooling peltier module, and/or a vent motor of the vent in response to a determination that the zone is not occupied. In some embodiments, the smart vent 706 operates the heating peltier module 1030, the cooling peltier module 1032, and/or the motor 1040 to reduce energy usage. For example, the motor 1040 may close the louvers 800. In some embodiments, the smart vent 706 can operate the heating peltier module 1030 and/or the cooling peltier module 1032 in a low power or off mode.

In step 1806, the vent can operate the heating peltier module, the cooling peltier module, and/or the vent motor of the vent to improve occupant comfort in response to a determination that the zone is occupied. In some embodiments, the smart vent 706 operates the motor 1040 to open the louvers 800 an appropriate amount to cool or heat the zone 5 to a predefined setting. Furthermore, the smart vent 706 can cause the heating peltier module 1030 or the cooling peltier module 1032 to operate to heat or cool the zone.

Referring now to FIG. 19, a process 1900 of performing model predictive control of a smart vent is shown, according to an exemplary embodiment. Steps of the process 1900 can be performed locally on a smart vent or by a controller device (e.g., a thermostat). One, multiple, or all of the smart vents 906-910, the smart vent 708, and the smart vent 706 can be configured to perform some or all of the steps of the process 1900. Furthermore, the thermostat 400 can be configured to perform some and/or all of the process 1900. The user device 904 can be configured to perform some or all of the steps of the process 1900. In some embodiments, some or all of the steps of the process 1900 is performed remotely, i.e., it is performed on a server. Furthermore, any computing device as described herein can be configured to perform the process 1900.

In step 1902, a device can generate one or more vent constraints for a vent. The constraints may be physical constraints louvers of the vent can be between a first position and a second position, a peltier module can only be activated for a predefined continuous length of time, etc. The constrains can be equality constraints and/or inequality constraints. In step 1904, an objective function can be generated by the device for the vent, the objective function indicating operating costs of the vent and/or user comfort levels.

In step 1906, the device can perform an optimization of the objective function of the step 1904 with the one or more vent constraints of the step 1902. The optimization may define one or multiple different operating settings for a vent at multiple points in time for a time horizon, a period of time into the future. In step 1908, the device can operate the vent based on the operation decisions of the step 1906. The device can cause the vent to open louvers and/or operate heating or cooling devices, e.g., peltier modules.

Referring now to FIG. 20, a process 2000 of performing predictive occupancy control is shown, according to an exemplary embodiment. Steps of the process 2000 can be performed locally on a smart vent or by a controller device (e.g., a thermostat). One, multiple, or all of the smart vents 906-910, the smart vent 708, and the smart vent 706 can be configured to perform some or all of the steps of the process 2000. Furthermore, the thermostat 400 can be configured to perform some and/or all of the process 2000. The user device 904 can be configured to perform some or all of the steps of the process 2000. In some embodiments, some or all of the steps of the process 2000 is performed remotely, i.e., it is performed on a server. Furthermore, any computing device as described herein can be configured to perform the process 2000.

In step 2002, a vent receives an indication of a schedule of a user. The schedule may be a programmed schedule provided to the smart vent 706, e.g., one or more times at which the user will or will not be present in a building or a particular zone, zone 5, associated with the smart vent 706. In some embodiments, the user provides, via the user interface 1310 of the thermostat 400, or via the user device 904, an indication of a television program of interest, a sports team of interest, a sport of interest, etc. In response to receiving the television interest, the thermostat 400 can retrieve a program schedule, e.g., times and durations of sports games for the sports team of interest, showing times of a television program of interest, etc. from a television program server. For example, if a user indicates that they are interested in United States Football, the thermostat 400 may retrieve times at which football is commonly played, e.g., Sunday afternoons, Monday nights, and/or Thursday nights.

In step 2004, the vent can determine future occupancy time periods for a zone associated with the vent. In some embodiments, the smart vent 706 determines, based on the schedule received in the step 2002. In step 2006, the vent can operate a heating peltier, a cooling peltier, and/or a vent motor to precool or preheat the zone base don't eh future occupancy time period. In this regard, a zone can be conditioned to a user desirable temperature setpoint prior to the user entering the zone. For example, the smart vent 706 can receive an indication of an interest in football. The smart vent 706 can retrieve football schedules and determine that on a particular day, Sunday, football games are scheduled between 12:00 P.M. and 10:00 P.M. The smart vent 706 can condition the zone 5 to a temperature setpoint so that at 12:00 P.M., the zone 5 is at the temperature setpoint. The smart vent 706 can cause the zone 5 to remain at the setpoint until 10:00 P.M.

Figure 21:
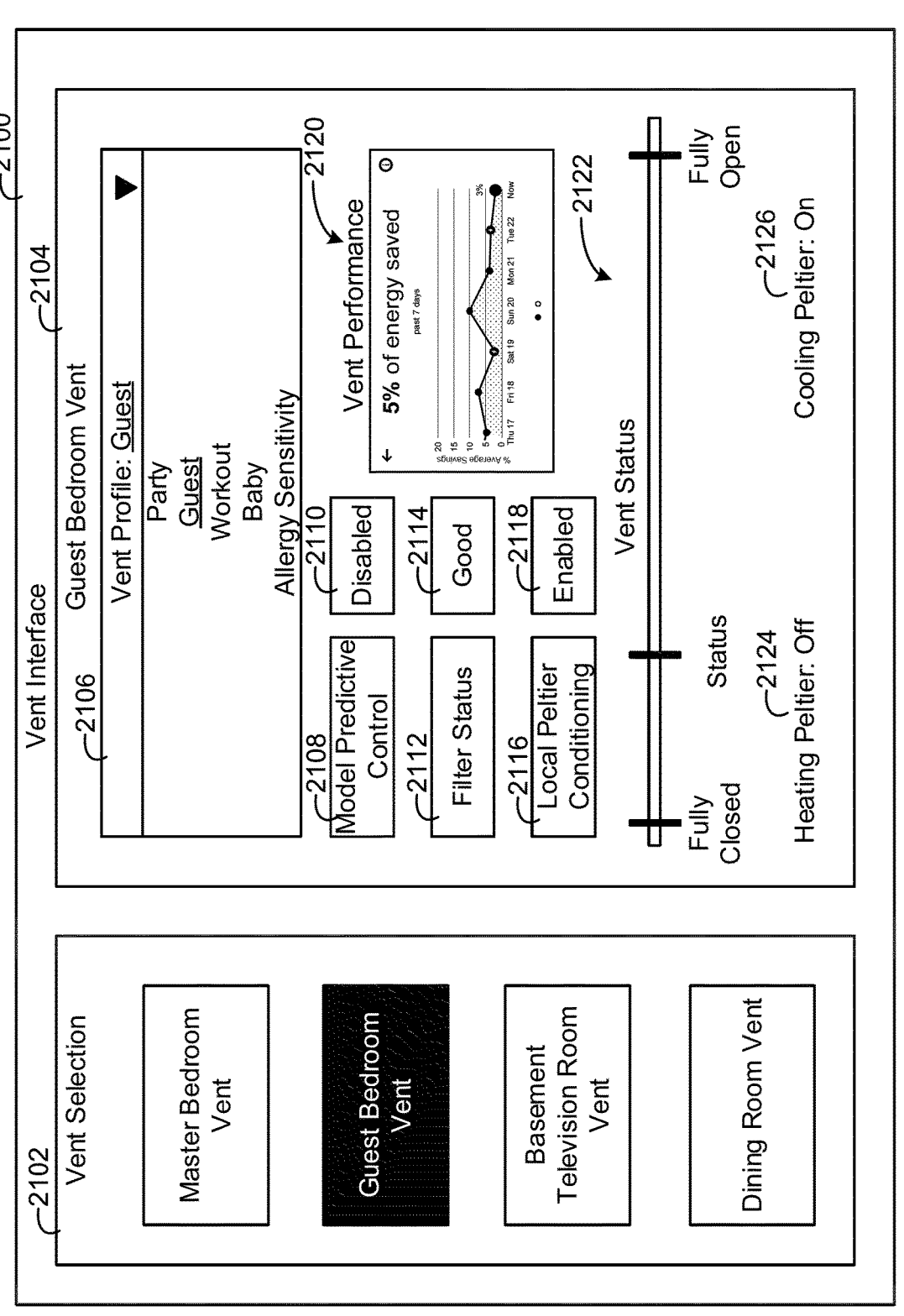
FIG. 21 is a smart vent interface providing a user with control and performance information for the smart vent system of FIG. 7, according to an exemplary embodiment.

Referring now to FIG. 21, an interface 2100 is shown for operating a smart vent, according to an exemplary embodiment. The vent interface 2100 can be displayed on user interface 1310 and/or on the user device 904. The interface 2100 includes a vent selection element 2102 allowing a user to select between multiple different vents of a building. The vents can each be given a name corresponding to the zone which they are located in. In some embodiments, a user provides the names for each of the vents during an installation and/or configuration phase. In FIG. 21, the "Guest Bedroom Vent" is selected. The vents shown in the element 2102 may be the smart vents 906-910, the smart vent 706, and the smart vent 708.

In FIG. 21, the interface element 2104 provides performance indications and setting adjustments for the "Guest Bedroom Vent." The element 2104 includes a selection element 2106 for selecting between various profiles for the "Guest Bedroom Vent." The selection element 2106 allows a user to select one of the profiles of the vent profile database 1300.

The element 2104 is shown to include an indication of model predictive control 2108. A user can interact with the element 2110 to enable or disable the model predictive control. The filter status element 2112 can indicate, via element 2114, whether a filter of the "Guest Bedroom Vent" is good or requires replacement. Element 2116 indicates local peltier conditioning within the Guest Bedroom Vent (if the Guest Bedroom Vent includes one or multiple peltier modules) and the element 2118 allows a user to enable or disable the peltier conditioning. Vent perform 2120 can be a graph indicating performance of the Guest Bedroom Vent, e.g., how much energy is utilized by the vent over time. The vent status 2122 element may allow a user to view or manually adjust, a louver position between a fully closed position and a fully open position. Furthermore, a status indicator 2124 of a heating peltier module and a status indicator 2126 of a cooling peltier module is included within the interface 2104.

Referring now to FIG. 22, a process 2200 of collaborative temperature control by a thermostat and a vent is shown, according to an exemplary embodiment. The steps of the process 2200 can be performed locally on a smart vent or by a controller device (e.g., a thermostat). One, multiple, or all of the smart vents 906-910, the smart vent 708, and the smart vent 706 can be configured to perform some or all of the steps of the process 2200. Furthermore, the thermostat 400 can be configured to perform some and/or all of the process 2200. The user device 904 can be configured to perform some or all of the steps of the process 2200. In some embodiments, some or all of the steps of the process 2200 are performed remotely, i.e., it is performed on a server. Furthermore, any computing device as described herein can be configured to perform the process 2200.

In step 2202, the thermostat 400 receives a first setpoint and operates building equipment to control a temperature of an air duct based on the first setpoint. For example, the thermostat 400 can receive a setpoint from a schedule, via a user interface, via the user device 904, etc. The thermostat 400 can operate building equipment such as heaters, air handlers, air conditioners, heat pumps, furnaces, the indoor unit 504, etc. Operating the equipment may cause the duct 704 to carry air, i.e., the building equipment may heat or cool the air and operate a fan to distribute the air through the duct 704.

In step 2204, the smart vent 708 can operate a louver or a set of louvers to control a temperature of a zone associated with the smart vent 708 to be a second temperature setpoint. In this regard, the smart vent 708 may operate the louvers 800 to cause an amount of air of the duct 704 to enter the zone. This regulation may cause the zone to become the second temperature setpoint. This allows the smart vent 708 to operate the zone at a temperature setpoint separate from the temperature setpoint of the thermostat. In some embodiments, the thermostat 400 stores the second temperature setpoint and/or multiple other temperature setpoints of other vents. The thermostat 400 may, based on the second temperature setpoint and/or multiple other temperature setpoints, determine the first temperature setpoint to be a value such that each vent can cause the associated zone to become the setpoint temperature of the zone.

In some embodiments, the smart vent 708 can communicate the second setpoint to the thermostat 400. For example, the smart vent 708 can, via the network 902 communicate the second setpoint to the thermostat 400. In some embodiments, the thermostat 400 may already store the second setpoint and may have previously pushed the second setpoint to the smart vent 708 via the network 902. However, in some embodiments, via the user device 904 or a local input device, a user may provide the second setpoint directly to the smart vent 706 and the thermostat may not store the second setpoint. Furthermore, the second setpoint can be determined via a control algorithm of the smart vent 708. The thermostat 400 can, based on the second setpoint and/or multiple other zone setpoints received from other vents, update a value of the first temperature setpoint. The updated value may be a value allowing each of the vents to meeting their respective setpoint in their respective zone.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A environmental control system for a building, the system comprising:
a vent configured to be connected to an air duct of the building, the vent comprising:
one or more actuators communicably coupled with one or more louvers that are configured to change position between an open position and a closed position to permit air from the air duct to enter a zone of the building or stop the air from entering the zone; and
a circuit configured to control the one or more actuators based on one or more control commands, wherein the circuit is configured to:
receive an operating profile from a profile database and an air quality signal;
determine and generate, based on the operating profile, one or more constraints for the vent;
generate an objective function indicating at least one of a comfort of an occupant in the zone and a cost associated with operating the vent; and
perform an optimization of the objective function with the one or more constraints to generate, via a control algorithm, the one or more control commands to control the one or more actuators to change positions of the one or more louvers to improve air quality of the zone in response to the air quality signal.

2. The system of claim 1, wherein the circuit is configured to:
receive a selection of the operating profile from a plurality of predefined operating profiles for the vent, each of the plurality of predefined operating profiles indicating an intended use of the zone; and
determine, based on the operating profile, the one or more control commands.

3. The system of claim 2, wherein the circuit is configured to:
communicate via a network with a user device, the user device presenting a selection interface to a user comprising one or more user interface elements to select one of the plurality of predefined operating profiles; and

44 receive the selection of the operating profile from the plurality of predefined operating profiles for the vent from the user device via the network.

4. The system of claim 2, wherein each of the plurality of predefined operating profiles is associated with one of a plurality of temperature offsets;
the circuit is configured to:
store a temperature setpoint for the building;
generate a new temperature setpoint by applying one of the plurality of temperature offsets associated with the selection of the operating profile to the temperature setpoint; and
determine the one or more control commands based on the new temperature setpoint.

5. The system of claim 2, wherein the plurality of predefined operating profiles comprise at least one of a baby room profile, a guest room profile, or an allergy sensitivity profile;
wherein the baby room profile comprises a first temperature setting, a first humidity setting, and a first air quality setting;
wherein the guest room profile comprises a custom temperature setting, a custom humidity setting, and a custom air quality setting; and
wherein the allergy sensitivity profile comprises a second air quality setting.

6. The system of claim 2, wherein the operating profile is an allergy sensitivity profile;
wherein the circuit comprises an air quality sensor configured to measure a pollen count of the building;
wherein the circuit is configured to:
receive the pollen count of the building; and
determine the one or more control commands to reduce the pollen count of the building in response to the selection of the allergy sensitivity profile.

7. The system of claim 1, wherein the vent further comprises: an air quality sensor configured to measure the air quality of the zone and provide the air quality signal.

8. The system of claim 1, wherein the vent further comprises a local heating module configured to heat the air, wherein the local heating module is a resistive heating circuit configured to heat the air by converting electrical energy into heat;
wherein the circuit is configured to operate the local heating module to heat the air to cause a temperature of the zone to reach a setpoint temperature.

9. The system of claim 1, wherein the circuit is configured to:
receive an occupant schedule indicating whether the zone will be occupied at a particular time in a future time; and
cause the circuit to control the one or more actuators a predefined amount of time before the particular time in the future time based on the one or more control commands to cause a temperature of the zone to be a desired temperature at the particular time in the future time.

10. The system of claim 1, wherein the circuit is configured to:
perform the optimization of the objective function with the one or more constraints to generate the one or more control commands, wherein the one or more control commands are commands at each of a plurality of points of time for a future time horizon; and
cause the circuit to control the one or more actuators based on the one or more control commands.

11. The system of claim 1, wherein the vent further comprises a fire detector configured to measure at least one condition, wherein the at least one condition is indicative of a fire within the building;

wherein the circuit is configured to:

determine, based on the at least one condition, whether there is the fire within the building; and control the one or more actuators to stop the air from entering the zone.

12. The system of claim 1, wherein the vent further comprises:

a filter device configured to filter the air; and a sensor device configured to measure a condition indicative of a status of the filter device; and wherein the circuit configured to:

control the one or more actuators based on the one or more control commands;

determine, based on the condition, whether the filter device needs to be replaced; and generate a filter replacement alarm in response to a determination that the filter device needs to be replaced.

13. A method of an environmental control system for a building, the method comprising:

receiving an operating profile from a profile database and an air quality signal;

determining and generating, based on the operating profile, one or more constraints for a vent;

generating an objective function including at least one of a comfort of an occupant in a zone and a cost associated with operating the vent;

performing an optimization of the objective function with the one or more constraints to generate, via a control algorithm, one or more control commands to cause air quality of the zone to be improved in response to the air quality signal; and operating, based on the one or more control commands, one or more actuators of the vent, wherein the one or more actuators are communicably coupled with one or more louvers that are configured to change position between an open position and a closed position to control an amount of air from an air duct entering the zone in response to the one or more control commands.

14. The method of claim 13, further comprising:

receiving, by a controller device, a selection of the operating profile from a plurality of predefined operating profiles for the vent, each of the plurality of predefined operating profiles indicating an intended use of the zone;

determining, by the controller device, based on the operating profile, the one or more control commands; and wherein the operating profile is an allergy sensitivity profile.

15. The method of claim 13, further comprising operating, by the vent, a peltier module of the vent based on the one or more control commands, wherein control of the one or more actuators and operation of the peltier module causes a temperature of the zone to be a particular temperature; and wherein the peltier module comprises a first side and a second side, wherein the first side is in contact with the air, wherein the first side is configured to perform at least one of heating the air or cooling the air.

16. The method of claim 13, further comprising:

receiving, by a controller device, an occupant schedule indicating whether the zone will be occupied at a particular time in a future time; and causing, by the controller device, the vent to control the one or more actuators a predefined amount of time before the particular time in the future time based on the one or more control commands to cause a temperature of the zone to be a desired temperature at the particular time in the future time.

17. The method of claim 13, further comprising:

performing, by a controller device, the optimization of the objective function with the one or more constraints to generate the one or more control commands, wherein the one or more control commands are commands at each of a plurality of points of time for a future time horizon.

18. The method of claim 13, further comprising:

determining, by the vent, based on at least one condition, whether there is a fire within the building, wherein the vent comprises a fire detector configured to measure the at least one condition, wherein the at least one condition is indicative of the fire within the building; and controlling, by the vent, the one or more actuators to stop the air from entering the zone.

19. The method of claim 13, further comprising:

determining, by the vent, based on a condition, whether a filter device of the vent configured to filter the air needs to be replaced, wherein the vent comprises a sensor device configured to measure the condition, wherein the condition is indicative of a status of the filter device; and generating, by the vent, a filter replacement alarm in response to a determination that the filter device needs to be replaced.

20. A smart vent system for a building, the system comprising:

a plurality of vents, wherein a vent of the plurality of vents is configured to be connected to an air duct of the building, the vent comprising:

one or more actuators communicably coupled with one or more louvers that are configured to change position between an open position and a closed position to permit air from the air duct to enter a zone of the building or stop the air from entering the zone; and a circuit configured to control the one or more actuators based on one or more control commands wherein the circuit is configured to:

receive an operating profile from a profile database and an air quality signal;

determine and generate, based on the operating profile, one or more constraints for the vent;

generate an objective function indicating at least one of a comfort of an occupant in the zone and a cost associated with operating the vent; and perform an optimization of the objective function with the one or more constraints to generate, via a control algorithm, the one or more control commands to control the one or more actuators to change positions of the one or more louvers in response to the air quality signal.

* * * * *